US009673943B2

(12) United States Patent
Seok

(10) Patent No.: US 9,673,943 B2
(45) Date of Patent: Jun. 6, 2017

(54) PHYSICAL LAYER PROTOCOL DATA UNIT FORMAT IN A HIGH EFFICIENCY WIRELESS LAN

(71) Applicant: NEWRACOM, INC., Irvine, CA (US)

(72) Inventor: Yongho Seok, Irvine, CA (US)

(73) Assignee: NEWRACOM, INC., Irvine, CA (US)

( * ) Notice: Subject to any disclaimer, the term of this patent is extended or adjusted under 35 U.S.C. 154(b) by 0 days.

(21) Appl. No.: 14/823,420

(22) Filed: Aug. 11, 2015

(65) Prior Publication Data

US 2016/0044533 A1 Feb. 11, 2016

Related U.S. Application Data

(60) Provisional application No. 62/147,487, filed on Apr. 14, 2015.

(30) Foreign Application Priority Data

Aug. 11, 2014 (KR) .................. 10-2014-0103276

(51) Int. Cl.
*H04W 28/06* (2009.01)
*H04L 5/00* (2006.01)
(Continued)

(52) U.S. Cl.
CPC .......... *H04L 5/0007* (2013.01); *H04L 5/0048* (2013.01); *H04L 27/2613* (2013.01);
(Continued)

(58) Field of Classification Search
CPC . H04W 28/06; H04W 72/0406; H04W 84/12; H04L 5/0007; H04L 27/2613;
(Continued)

(56) References Cited

U.S. PATENT DOCUMENTS

2014/0307650 A1* 10/2014 Vermani ............... H04L 5/0044
370/329
2015/0071372 A1* 3/2015 Zhang ................ H04L 27/2602
375/295
2015/0139205 A1* 5/2015 Kenney ............... H04W 52/241
370/338

OTHER PUBLICATIONS

"Part 11: Wireless LAN Medium Access Control (MAC) and Physical Layer (PHY) Specifications, Amendment 9: Interworking with External Networks", IEEE Std 802.11 u™-2011, Feb. 25, 2011, pp. 1-190, IEEE, New York, NY, USA.
(Continued)

*Primary Examiner* — Omar Ghowrwal

(57) ABSTRACT

The present invention relates to a new Physical layer Protocol Data unit (PPDU) format and a transmission and reception method and apparatus using the new PPDU format in a Wireless Local Area Network (WLAN). According to one aspect of the present invention, a method for transmitting a PPDU frame to a reception apparatus by a transmission apparatus in a WLAN may be provided. The method may include generating a legacy preamble, generating a High Efficiency (HE)-preamble, and transmitting a PPDU frame including a first region and a second region to the reception apparatus, the first region including the legacy preamble and a first field and the second region including the HE-preamble. The first field may have a variable length, and the HE-preamble may include a High Efficiency-Short Training Field (HE-STF) following the first field.

14 Claims, 21 Drawing Sheets

(51) Int. Cl.
  *H04L 27/26* (2006.01)
  *H04W 84/12* (2009.01)
(52) U.S. Cl.
  CPC .......... *H04L 5/0023* (2013.01); *H04L 5/0039* (2013.01); *H04L 5/0089* (2013.01); *H04W 84/12* (2013.01)
(58) Field of Classification Search
  CPC ... H04L 5/0048; H04L 5/0023; H04L 5/0089; H04L 5/0039
  See application file for complete search history.

(56) References Cited

OTHER PUBLICATIONS

"Part 11: Wireless LAN Medium Access Control (MAC) and Physical Layer (PHY) Specifications", IEEE Std 802.11™-2012 (Revision of IEEE Std 802.11-2007), Mar. 29, 2012, pp. 1-2695, IEEE, New York, NY, USA.

"Part 11: Wireless LAN Medium Access Control (MAC) and Physical Layer (PHY) Specifications, Amendment 4: Enhancements for Very High Throughput for Operation in Bands below 6 GHz", IEEE Std 802.11ac™-2013, Dec. 11, 2013, pp. 1-395, IEEE, New York, NY, USA.

\* cited by examiner

FIG. 10

| L-STF | L-LTF | L-SIG | HE-SIG-A | HE-STF | HE-LTF | HE-LTF | HE-LTF | HE-SIG-B | PSDU(AP to STA6) |
| | | | | HE-STF | HE-LTF | HE-LTF | HE-LTF | HE-SIG-B | PSDU(AP to STA5) |
| | | | | HE-STF | HE-LTF | HE-LTF | HE-LTF | HE-SIG-B | PSDU(AP to STA3, STA4) |
| | | | | HE-STF | HE-LTF | HE-LTF | HE-LTF | HE-SIG-B | PSDU(AP to STA1, STA2) |

FIG. 11

| L-STF | L-LTF | L-SIG | HE-SIG-A | HE-STF | HE-LTF | HE-SIG-B | HE-LTF | HE-LTF | HE-LTF | HE-SIG-C | PSDU(AP to STA6) |
| | | | | HE-STF | HE-LTF | HE-SIG-B | HE-LTF | HE-LTF | HE-LTF | HE-SIG-C | PSDU(AP to STA5) |
| | | | | HE-STF | HE-LTF | HE-SIG-B | HE-LTF | HE-LTF | HE-LTF | HE-SIG-C | PSDU(AP to STA3,STA4) |
| | | | | HE-STF | HE-LTF | HE-SIG-B | HE-LTF | HE-LTF | HE-LTF | HE-SIG-C | PSDU(AP to STA1,STA2) |

FIG. 12

PHYSICAL LAYER PROTOCOL DATA UNIT FORMAT IN A HIGH EFFICIENCY WIRELESS LAN

This application claims the benefit of Korean Patent Application No. 10-2014-0103276, filed on Aug. 11, 2014, which is hereby incorporated by reference as if fully set forth herein. This application claims the benefit of U.S. Provisional Application No. 62/147,487, filed on Apr. 14, 2015, which is hereby incorporated by reference as if fully set forth herein.

BACKGROUND OF THE INVENTION

Field of the Invention

The present invention relates to a Wireless Local Area Network (WLAN), and more particularly, to a Physical layer protocol Data Unit (PPDU) format in a High Efficiency WLAN (HEW), a transmitting method, receiving method, transmitting apparatus, receiving apparatus, and software using the PPDU format, and a recording medium that stores the software.

Discussion of the Related Art

Along with the recent development of information and telecommunication technology, various wireless communication techniques have been developed. Among them, the WLAN enables a user to wirelessly access the Internet based on radio frequency technology in a home, an office, or a specific service area using a portable terminal such as a Personal Digital Assistant (PDA), a laptop computer, a Portable Multimedia Player (PMP), a smartphone, etc.

To overcome limitations in communication speed that the WLAN faces, the recent technical standards have introduced a system that increases the speed, reliability, and coverage of a wireless network. For example, the Institute of Electrical and Electronics Engineers (IEEE) 802.11 n standard has introduced Multiple Input Multiple Output (MIMO) that is implemented using multiple antennas at both a transmitter and a receiver in order to support High Throughput (HT) at a data processing rate of up to 540 Mbps, minimize transmission errors, and optimize data rates.

SUMMARY OF THE INVENTION

Objects of the present invention is to provide a new Physical layer protocol Data Unit (PPDU) format supporting a legacy system and Multi-User (MU) transmission (e.g., Multiple-User Multiple Input Multiple Output (MU-MIMO) and Orthogonal Frequency Division Multiple Access (OFMDA)), and a method for transmitting and receiving the PPDU format.

The objects of the present invention are not limited to the foregoing descriptions, and additional objects will become apparent to those having ordinary skill in the pertinent art to the present invention based upon the following descriptions.

In an aspect of the present invention, a method for transmitting a PPDU frame to a reception apparatus by a transmission apparatus in a WLAN may be provided. The method may include generating a legacy preamble, generating a High Efficiency (HE)-preamble, and transmitting a PPDU frame including a first region and a second region to the reception apparatus, the first region including the legacy preamble and a first field and the second region including the HE-preamble. The first field may have a variable length, and the HE-preamble may include a High Efficiency-Short Training Field (HE-STF) following the first field.

In another aspect of the present invention, a method for receiving a PPDU frame from a transmission apparatus by a reception apparatus in a WLAN may be provided. The method may include receiving a first region including a legacy preamble and a first field in a PPDU frame, and receiving a second region including a HE-preamble in the PPDU frame based on information included in the first region. The first field may have a variable length, and the HE-preamble may include a HE-STF following the first field.

In another aspect of the present invention, a transmission apparatus for transmitting a PPDU frame to a reception apparatus in a WLAN may be provided. The transmission apparatus may include a baseband processor, a Radio Frequency (RF) transceiver, a memory, etc. The baseband processor is configured to generate a legacy preamble, to generate a HE-preamble, and to transmit a PPDU frame including a first region and a second region to the reception apparatus using the RF transceiver, the first region including the legacy preamble and a first field and the second region including the HE-preamble. The first field may have a variable length, and the HE-preamble may include a HE-STF following the first field.

In another aspect of the present invention, a reception apparatus for receiving a PPDU frame from a transmission apparatus in a WLAN may be provided. The reception apparatus may include a baseband processor, an RF transceiver, a memory, etc. The baseband processor may be configured to receive a first region including a legacy preamble and a first field in a PPDU frame using the RF transceiver, and to receive a second region including a HE-preamble in the PPDU frame based on information included in the first region using the RF transceiver. The first field may have a variable length, and the HE-preamble may include a HE-STF following the first field.

In another aspect of the present invention, a software or computer-readable medium having instructions executable for a transmission apparatus to transmit a PPDU frame to a reception apparatus in a WLAN may be provided. The executable instructions may operate the transmission apparatus to generate a legacy preamble, to generate a HE-preamble, and to transmit a PPDU frame including a first region and a second region to the reception apparatus, the first region including the legacy preamble and a first field and the second region including the HE-preamble. The first field may have a variable length, and the HE-preamble may include a HE-STF following the first field.

In another aspect of the present invention, a software or computer-readable medium having instructions executable for a reception apparatus to receive a PPDU frame from a transmission apparatus in a WLAN may be provided. The executable instructions may operate the reception apparatus to receive a first region including a legacy preamble and a first field in a PPDU frame, and to receive a second region including a HE-preamble in the PPDU frame based on information included in the first region. The first field may have a variable length, and the HE-preamble may include a HE-STF following the first field.

It is to be understood that both the foregoing summarized features are exemplary aspects of the following detailed description of the present invention without limiting the scope of the present invention.

According to the present invention, a new PPDU format supporting a legacy system and MU transmission (e.g., MU-MIMO and OFMDA), and a method for transmitting and receiving the PPDU format can be provided.

The advantages of the present invention are not limited to the foregoing descriptions, and additional advantages will become apparent to those having ordinary skill in the pertinent art to the present invention based upon the following descriptions.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

The accompanying drawings, which are included to provide a further understanding of the invention and are incorporated in and constitute a part of this application, illustrate embodiment(s) of the invention and together with the description serve to explain the principle of the invention. In the drawings:

FIG. 10 depicts the starting and ending points of an High Efficiency Long Training Field (HE-LTF) field in a HE PPDU frame format according to the present invention;

FIG. 11 depicts a High Efficiency SIGnal B (HE-SIG-B) field and a High Efficiency SIGnal C (HE-SIG-C) field in the HE PPDU frame format according to the present invention:

FIG. 12 depicts another exemplary HE PPDU frame format according to the present invention;

DETAILED DESCRIPTION OF THE INVENTION

Figure 1:
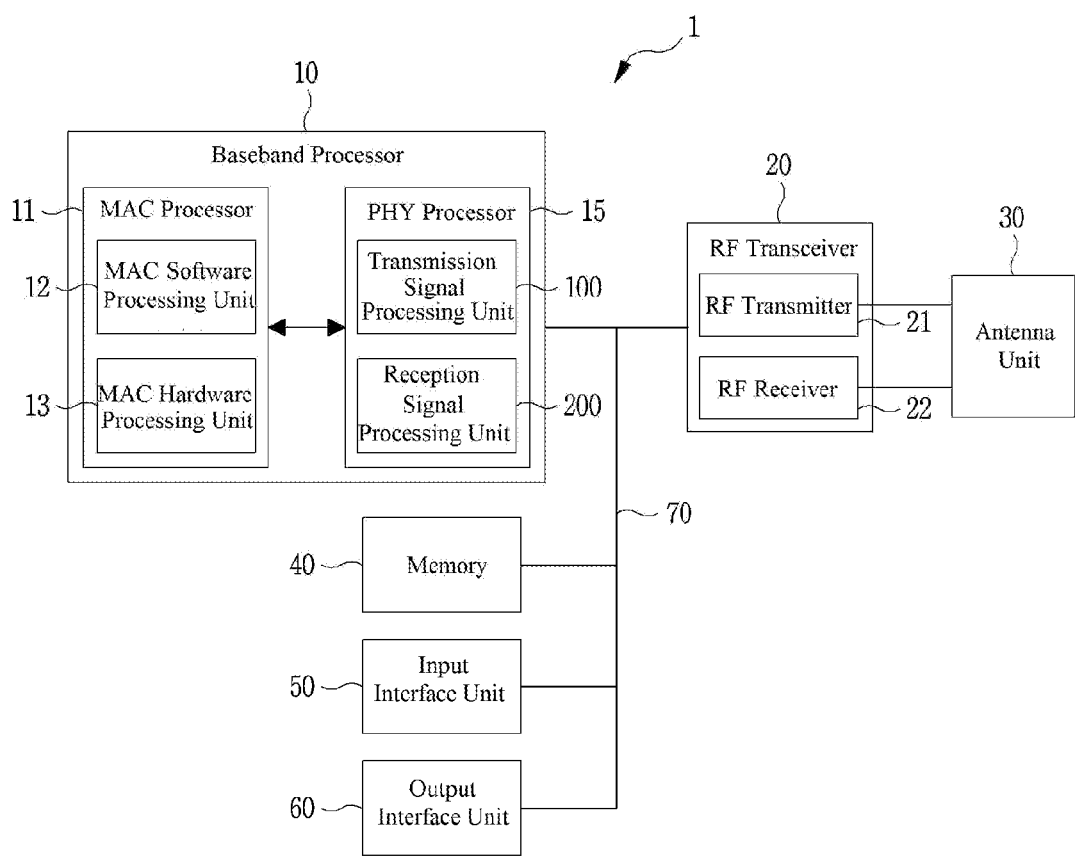
FIG. 1 is a block diagram of a Wireless Local Area Network (WLAN) device.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In a Wireless Local Area network (WLAN), a Basic Service Set (BSS) includes a plurality of WLAN devices. A WLAN device may include a Medium Access Control (MAC) layer and a PHYsical (PHY) layer according to Institute of Electrical and Electronics Engineers (IEEE) 802.11 series standards. In the plurality of WLAN devices, at least one the WLAN device may be an Access Point (AP) and the other WLAN devices may be non-AP Stations (non-AP STAs). Alternatively, all of the plurality of WLAN devices may be non-AP STAs in an ad-hoc networking environment. In general, AP STA and non-AP STA may be each referred to as a STA or may be collectively referred to as STAs. However, for ease of description herein, only the non-AP STAs may be referred to herein as the STAs.

FIG. 1 is a block diagram of a WLAN device.

Referring to FIG. 1, a WLAN device 1 includes a baseband processor 10, a Radio Frequency (RF) transceiver 20, an antenna unit 30, a memory 40, an input interface unit 50, an output interface unit 60, and a bus 70.

The baseband processor 10 may be simply referred to as a processor, performs baseband signal processing described in the present specification, and includes a MAC processor (or MAC entity) 11 and a PHY processor (or PHY entity) 15.

In an embodiment of the present invention, the MAC processor 11 may include a MAC software processing unit 12 and a MAC hardware processing unit 13. The memory 40 may store software (hereinafter referred to as 'MAC software') including at least some functions of the MAC layer. The MAC software processing unit 12 may execute the MAC software to implement some functions of the MAC layer, and the MAC hardware processing unit 13 may implement the remaining functions of the MAC layer in hardware (hereinafter referred to as 'MAC hardware'). However, the MAC processor 11 is not limited to the foregoing implementation examples.

The PHY processor 15 includes a transmitting (TX) signal processing unit 100 and a receiving (RX) signal processing unit 200.

The baseband processor 10, the memory 40, the input interface unit 50, and the output interface unit 60 may communicate with one another via the bus 70.

The RF transceiver 20 includes an RF transmitter 21 and an RF receiver 22.

The memory 40 may further store an Operating System (OS) and applications. The input interface unit 50 receives information from a user, and the output interface unit 60 outputs information to the user.

The antenna unit 30 includes one or more antennas. When Multiple input Multiple Output (MIMO) or Multi-User MIMO (MU-MIMO) is used, the antenna unit 30 may include a plurality of antennas.

Figure 2:
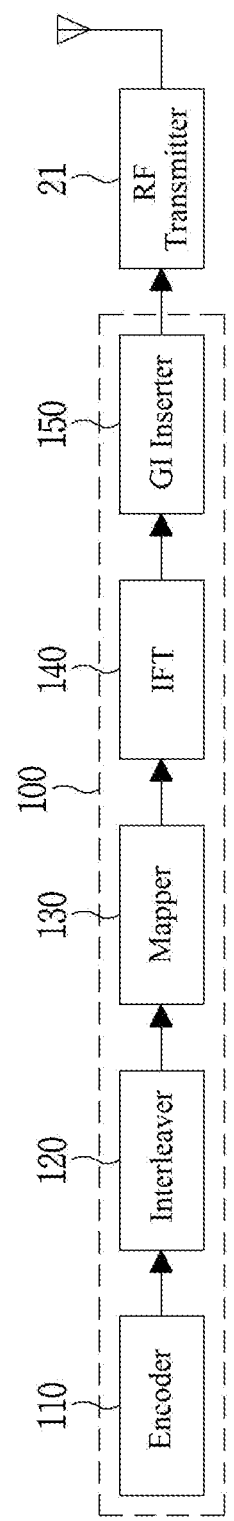
FIG. 2 is a schematic block diagram of an exemplary transmitting signal processing unit in a WLAN.

FIG. 2 is a schematic block diagram of an exemplary transmission signal processor in a WLAN.

Referring to FIG. 2, the transmitting signal processing unit 100 may include an encoder 110, an interleaver 120, a mapper 130, an Inverse Fourier Transformer (IFT) 140, and a Guard Interval (GI) inserter 150.

The encoder 110 encodes input data. For example, the encoder 110 may be a Forward Error Correction (FEC) encoder. The FEC encoder may include a Binary Convolutional Code (BCC) encoder followed by a puncturing device, or the FEC encoder may include a Low-Density Parity-Check (LDPC) encoder.

The transmitting signal processing unit 100 may further include a scrambler for scrambling the input data before encoding to reduce the probability of long sequences of 0s or 1s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder 110 to change the order of bits. Interleaving may be applied only when BCC encoding is used in the encoder 110. The mapper 130 maps the sequence of bits output from the interleaver 120 to constellation points. If LDPC encoding is used in the encoder 110, the mapper 130 may further perform LDPC tone mapping in addition to constellation mapping.

When MIMO or MU-MIMO is used, the transmitting signal processing unit 100 may use a plurality of interleavers 120 and a plurality of mappers 130 corresponding to the number of spatial streams, $N_{SS}$. In this case, the transmitting signal processing unit 100 may further include a stream parser for dividing outputs of the BCC encoders or output of the LDPC encoder into blocks that are sent to different interleavers 120 or mappers 130. The transmitting signal processing unit 100 may further include a Space-Time Block Code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of constellation points output from the mapper 130 or the spatial mapper to a time-domain block (i.e., a symbol) by using Inverse Discrete Fourier Transform (IDFT) or Inverse Fast Fourier Transform (IFFT). If the STBC encoder and the spatial mapper are used, the IFT 140 may be provided for each transmit chain.

When MIMO or MU-MEMO is used, the transmitting signal processing unit 100 may insert Cyclic Shift Diversities (CSDs) to prevent unintentional beamforming. The CSD insertion may occur before or after IFT. The CSD may be specified per transmit chain or may be specified per space-time stream. Alternatively, the CSD may be applied as a part of the spatial mapper.

When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

Figure 3:
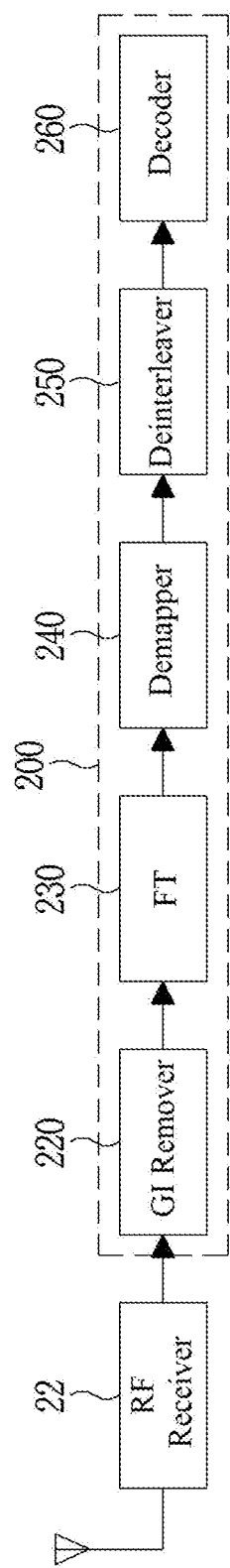
FIG. 3 is a schematic block diagram of an exemplary receiving signal processing unit in a WLAN.

FIG. 3 is a schematic block diagram of an exemplary a receiving signal processor in a WLAN.

Referring to FIG. 3, the receiving signal processing unit 200 includes a GI remover 220, a Fourier Transformer (FT) 230, a demapper 240, a deinterleaver 250, and a decoder 260.

An RF receiver 22 receives an RF signal via the antenna unit 30 and converts the RF signal into symbols. The GI remover 220 removes the GI from the symbol. When MIMO or MU-MIMO is used, the RF receiver 22 and the GI remover 220 may be provided for each receive chain.

The FT 230 converts the symbol (i.e., the time-domain block) into a block of constellation points by using a Discrete Fourier Transform (DFT) or a Fast Fourier Transform (FFT). The FT 230 may be provided for each receive chain.

When MIMO or MU-MIMO is used, the receiving signal processing unit 200 may include a spatial demapper for converting Fourier Transformed receiver chains to constellation points of the space-time streams, and an STBC decoder for despreading the constellation points from the space-time streams into the spatial streams.

The demapper 240 demaps the constellation points output from the FT 230 or the STBC decoder to bit streams. If LDPC encoding is applied to the received signal, the demapper 240 may further perform LDPC tone demapping before constellation demapping. The deinterleaver 250 deinterleaves the bits of each stream output from the demapper 240. Deinterleaving may be applied only when a BCC encoding scheme is applied to the received signal.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 200 may not use the encoder deparser.

In a WLAN system, Carrier Sense Multiple Access with Collision Avoidance (CSMA/CA) is a basic MAC access mechanism. The CSMA/CA mechanism is referred to as Distributed Coordination Function (DCF) of IEEE 802.11 MAC, shortly as a 'listen before talk' access mechanism. According to the CSMA/CA mechanism, an AP and/or a STA may sense a medium or a channel for a predetermined time before starting transmission, that is, may perform Clear Channel Assessment (CCA). If the AP or the STA determines that the medium or channel is idle, it may start to transmit a frame on the medium or channel. On the other hand, if the AP and/or the STA determines that the medium or channel is occupied or busy, it may set a delay period (e.g., a random backoff period), wait for the delay period without starting transmission, and then attempt to transmit a frame. By applying a random backoff period, a plurality of STAs are expected to attempt frame transmission after waiting for different time periods, resulting in minimizing collisions.

Figure 4:
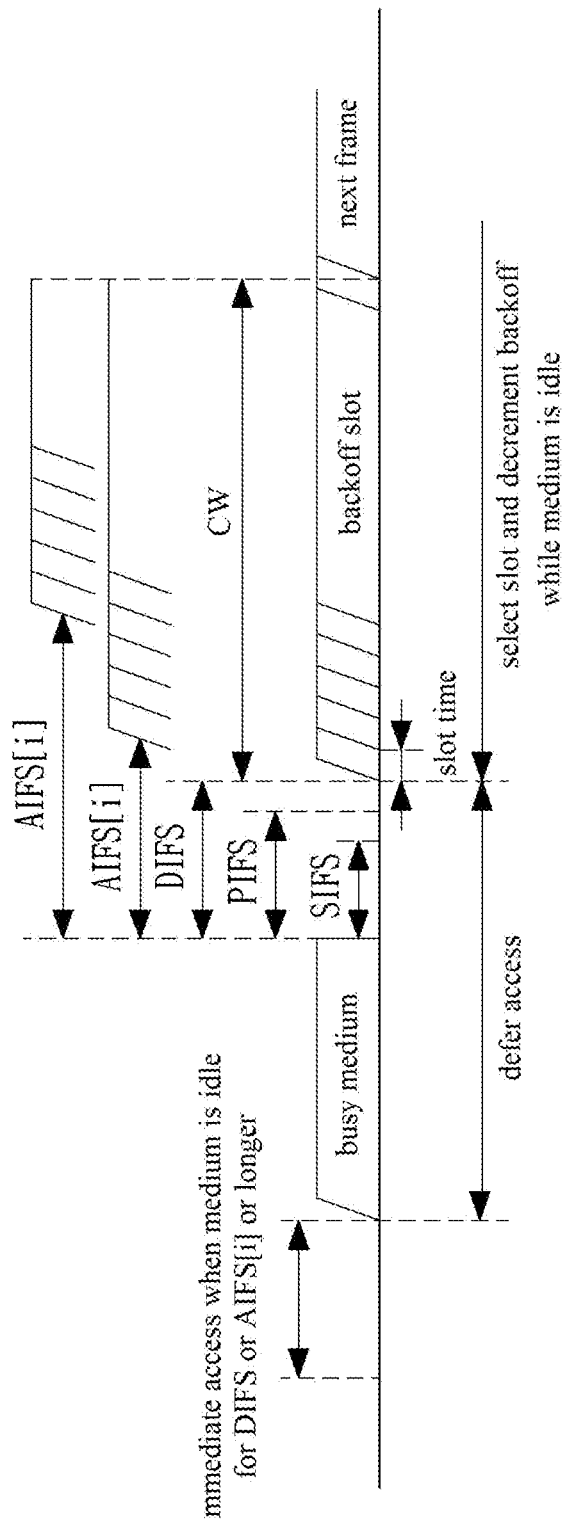
FIG. 4 depicts a relationship between InterFrame Spaces (IFSs)

FIG. 4 depicts a relationship between InterFrame Spaces (IFSs).

WLAN devices may exchange data frames, control frames, and management frames with each other.

A data frame is used for transmission of data forwarded to a higher layer. The WLAN device transmits the data frame after performing backoff if a Distributed Coordination Function IFS (DIFS) has elapsed from a time when the medium has been idle. A management frame is used for exchanging management information which is not forwarded to the higher layer. The WLAN device transmits the management frame after performing backoff if an IFS such as the DIFS or a Point Coordination Function IFS (PIFS) has elapsed. Subtype frames of the management frame include a beacon frame, an association request/response frame, a probe request/response frame, and an authentication request/response frame. A control frame is used for controlling access to the medium. Subtype frames of the control frame include a Request-To-Send (RTS) frame, a Clear-To-Send (CTS) frame, and an ACKnowledgement (ACK) frame. In the case that the control frame is not a response frame to another frame, the WLAN device transmits the control frame after performing backoff if the DIFS has elapsed. In case that the control frame is a response frame to another frame, the WLAN device transmits the control frame without performing backoff if a Short IFS (SIFS) has elapsed. The type and subtype of a frame may be identified by a type field and a subtype field in a Frame Control (FC) field.

On the other hand, a Quality of Service (QoS) STA transmits a frame after performing backoff if an Arbitration IFS (AIFS) for an associated Access Category (AC), i.e., AIFS[i](i is determined based on AC) has elapsed. In this case, the AIFC[i] may be used for a data frame, a management frame, or a control frame that is not a response frame.

In the example illustrated in FIG. 4, upon generation of a frame to be transmitted, a STA may transmit the frame immediately, if it determines that the medium is idle for the DIFS or AIFS[i] or longer. The medium is busy for a time period during which the STA transmits the frame. During the time period, upon generation of a frame to be transmitted, another STA may defer access by confirming that the medium is busy. If the medium gets idle, the STA that intends to transmit the frame may perform a backoff operation after a predetermined IFS in order to minimize collision with any other STA. Specifically, the STA that intends to transmit the frame selects a random backoff count, waits for a slot time corresponding to the selected random backoff count, and then attempt transmission. The random backoff count is determined based on a Contention Window (CW) parameter and the medium is monitored continuously during count-down of backoff slots (i.e. decrement a backoff count-down) according to the determined backoff count. If the STA monitors the medium as busy, the STA discontinues the count-down and waits, and then, if the medium gets idle, the STA resumes the count-down. If the backoff slot count reaches 0, the STA may transmit the next frame.

Figure 5:
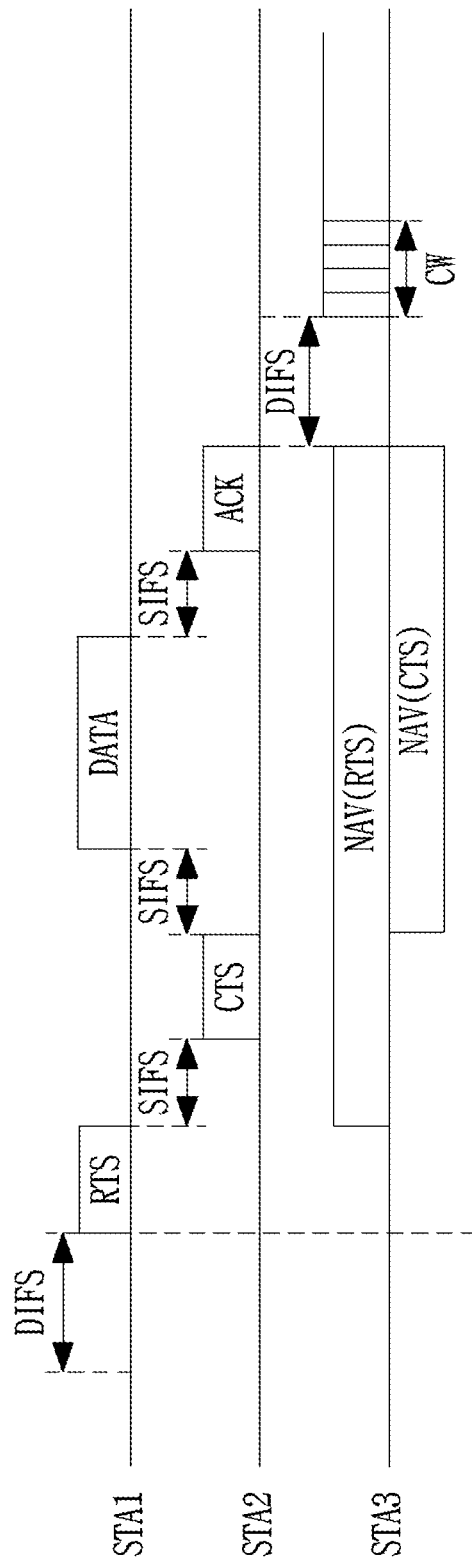
FIG. 5 is a conceptual diagram illustrating a procedure for transmitting a frame in Carrier Sense Multiple Access with Collision Avoidance (CSMA/CA) for avoiding collisions between frames in a channel.

FIG. 5 is a conceptual diagram illustrating a CSMA/CA-based frame transmission procedure for avoiding collisions between frames in a channel.

Referring FIG. 5, a first STA (STA1) is a transmit WLAN device for transmitting data, a second STA (STA2) is a receive WLAN device for receiving the data from STA1, and a third STA (STA3) is a WLAN device which may be located in an area where a frame transmitted from STA1 and/or a frame transmitted from STA2 can be received by STA3.

STA1 may determine whether the channel is busy by carrier sensing. The STA1 may determine the channel occupation based on an energy level on the channel or correlation of signals in the channel, or may determine the channel occupation by using a Network Allocation Vector (NAV) timer.

After determining that the channel is not being used by other devices during DIFS (that is, the channel is idle), STA1 may transmit an RTS frame to STA2 after performing backoff. Upon receiving the RTS frame, STA2 may transmit a CTS frame as a response to the CTS frame after SIFS.

When STA3 receives the RTS frame, STA3 may set the NAV timer for a transmission duration of subsequently transmitted frame by using duration information included in the RTS frame. For example, the NAV timer may be set for a duration of SIFS+CTS frame duration+SIFS+data frame duration+SIFS+ACK frame duration. When STA3 receives the CTS frame, it may set the NAV timer for a transmission duration of subsequently transmitted frames by using duration information included in the CTS frame. For example, the NAV timer may be set for a duration of SIFS+a data frame duration+SIFS+an ACK frame duration. Upon receiving a new frame before the NAV timer expires, STA3 may update the NAV timer by using duration information included in the new frame. STA3 does not attempt to access the channel until the NAV timer expires.

When STA1 receives the CTS frame from STA2, it may transmit a data frame to STA2 after SIFS elapsed from the CTS frame has been completely received. Upon successfully receiving the data frame, STA2 may transmit an ACK frame as a response to the data frame after SIFS elapsed.

When the NAV timer expires, STA3 may determine whether the channel is busy through the use of carrier sensing. Upon determining that the channel is not in use by other devices during DIFS and after the NAV timer has expired, STA3 may attempt channel access after a contention window after a random backoff has elapsed.

Figure 6:
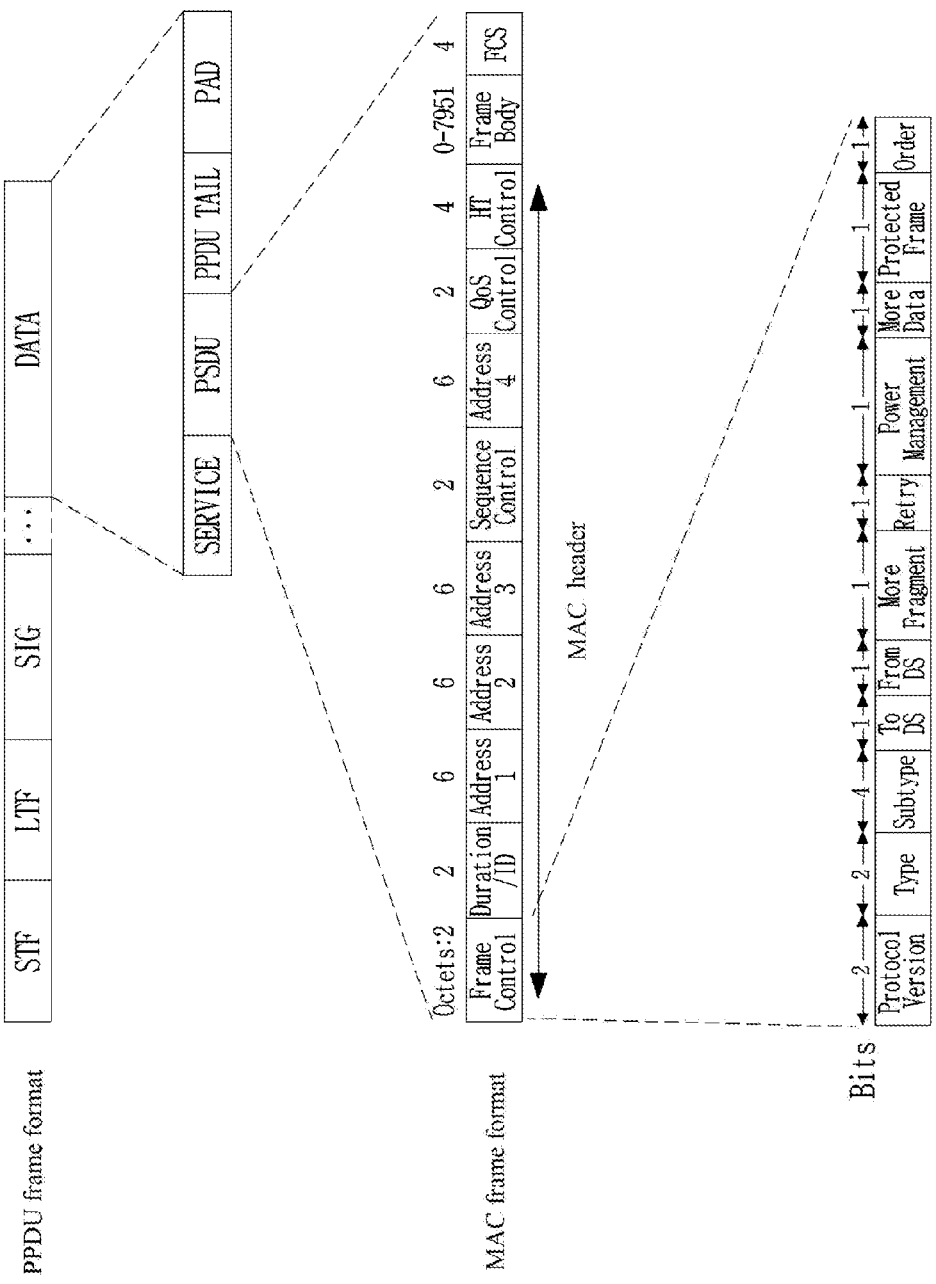
FIG. 6 depicts an exemplary frame structure in a WLAN system.

FIG. 6 depicts an exemplary frame structure in a WLAN system.

PHY layer may prepare a transmission MAC PDU (MPDU) in response to an instruction (or a primitive, which is a set of instructions or a set of parameters) by the MAC layer. For example, upon receipt of an instruction requesting transmission start from the MAC layer, the PHY layer may switch to a transmission mode, construct a frame with information (e.g., data) received from the MAC layer, and transmit the frame.

Upon detection of a valid preamble in a received frame, the PHY layer monitors a header of the preamble and transmits an instruction indicating reception start of the PHY layer to the MAC layer.

Information is transmitted and received in frames in the WLAN system. For this purpose, a Physical layer Protocol Data Unit (PPDU) frame format is defined.

A PPDU frame may include a Short Training Field (STF) field, a Long Training Field (LTF) field, a SIGNAL (SIG) field, and a Data field. The most basic (e.g., a non-High Throughput (non-HT)) PPDU frame may include only a Legacy-STF (L-STF) field, a Legacy-LTF (L-LTF) field, a SIG field, and a Data field. Additional (or other types of) STF, LTF, and SIG fields may be included between the SIG field and the Data field according to the type of a PPDU frame format (e.g., an HT-mixed format PPDU, an HT-greenfield format PPDU, a Very High Throughput (VHT) PPDU, etc.).

The STF is used for signal detection, Automatic Gain Control (AGC), diversity selection, fine time synchronization, etc. The LTF field is used for channel estimation, frequency error estimation, etc. The STF and the LTF fields may be referred to as signals for OFDM PHY layer synchronization and channel estimation.

The SIG field may include a RATE field and a LENGTH field. The RATE field may include information about a modulation scheme and coding rate of data. The LENGTH field may include information about the length of the data. The SIG field may further include parity bits, SIG TAIL bits, etc.

The Data field may include a SERVICE field, a Physical layer Service Data Unit (PSDU), and PPDU TAIL bits. When needed, the Data field may further include padding bits. A part of the bits of the SERVICE field may be used for synchronization at a descrambler of a receiver. The PSDU corresponds to a MAC PDU defined at the MAC layer and may include data generated/used in a higher layer. The PPDU TAIL bits may be used to return an encoder to a zero state. The padding bits may be used to match the length of the Data filed in predetermined units.

A MAC PDU is defined according to various MAC frame formats. A basic MAC frame includes a MAC header, a frame body, and a Frame Check Sequence (FCS). The MAC frame includes a MAC PDU and may be transmitted and received in the PSDU of the data part in the PPDU frame format.

The MAC header includes a Frame Control field, a Duration/Identifier (ID) field, an Address field, etc. The Frame Control field may include control information required for frame transmission/reception. The Duration/ID field may be set to a time for transmitting the frame. For details of Sequence Control, QoS Control, and HT Control subfields of the MAC header, refer to the IEEE 802.11-2012 technical specification.

The Frame Control field of the MAC header may include Protocol Version, Type, Subtype, To DS, From DS, More Fragment, Retry, Power Management, More Data, Protected Frame, and Order subfields. For the contents of each subfield in the Frame Control field, refer to the IEEE 802.11-2012 technical specification.

A Null-Data Packet (NDP) frame format is a frame format that does not include a data packet. In other words, the NDP frame format includes only a Physical Layer Convergence Protocol (PLCP) header part (i.e., the STF, LTF, and SIG fields) of the general PPDU frame format, without the remaining part (i.e., the Data field) of the general PPDU frame format. The NDP frame format may be referred to as a short frame format.

The IEEE 802.11 ax task group is discussing a WLAN system, called a High Efficiency WLAN (HEW) system, that operates in 2.4 GHz or 5 GHz and supports a channel bandwidth (or channel width) of 20 MHz. 40 MHz, 80 MHz, or 160 MHz. The present invention defines a new PPDU frame format for the IEEE 802.11ax HEW system. The new PPDU frame format may support MU-MIMO or OFDMA. A PPDU of the new format may be referred to as a 'HEW PPDU' or 'HE PPDU' (similarly, HEW xyz may be referred to as 'HE xyz' or 'HE-xyz' in the following descriptions).

In present specification, the term 'MU-MIMO or OFDMA mode' includes MU-MIMO without using OFDMA, or OFDMA mode without using MU-MIMO in an orthogonal frequency resource, or OFDMA mode using MU-MIMO in an orthogonal frequency resource.

Figure 7:
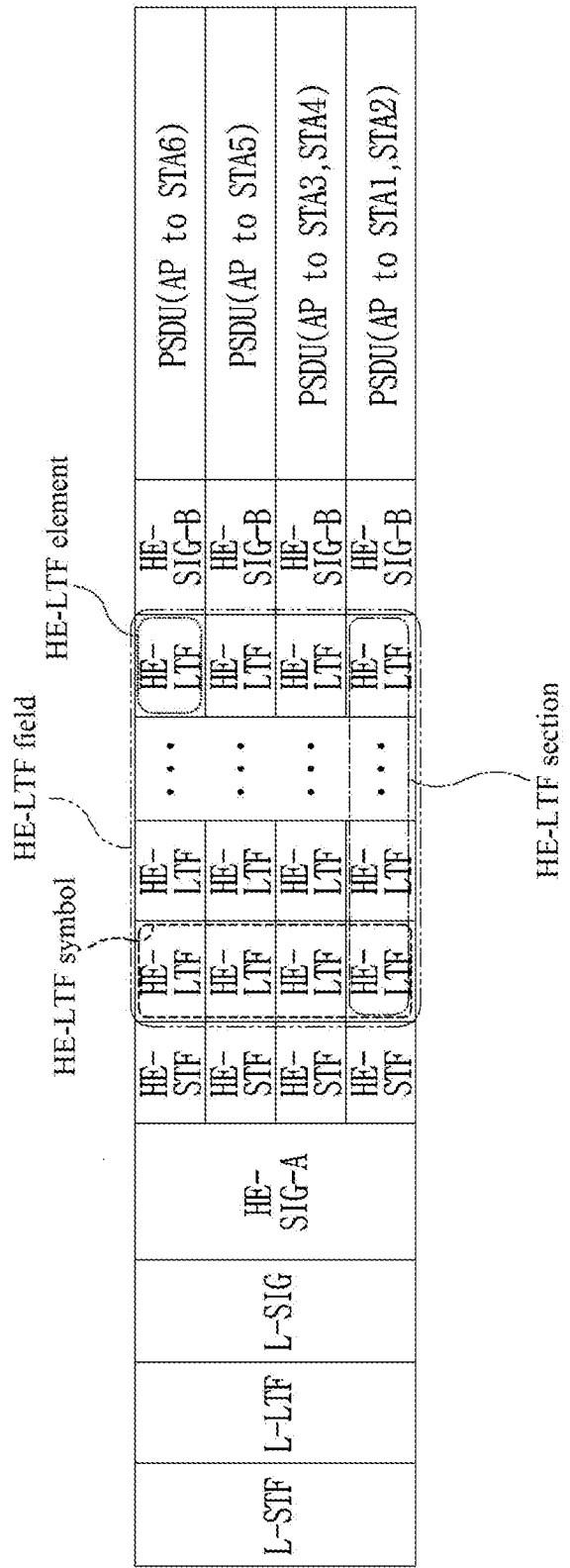
FIG. 7 depicts an exemplary High Efficiency (HE) Physical layer Protocol Data Unit (PPDU) frame format according to the present invention.

FIG. 7 depicts an exemplary HE PPDU frame format according to the present invention.

Referring to FIG. 7, the vertical axis represents frequency and the horizontal axis represents time. It is assumed that frequency and time increase in the upward direction and the right direction, respectively.

In the example of FIG. 7, one channel includes four subchannels. An L-STF, an L-LTF, an L-SIG, and an HE-SIG-A may be transmitted per channel (e.g., 20 MHz), a HE-STF and a HE-LTF may be transmitted on each subchannel being a basic subchannel unit (e.g., 5 MHz), and a HE-SIG-B and a PSDU may be transmitted on each of subchannels allocated to a STA. A subchannel allocated to a STA may have a size required for PSDU transmission to the STA. The size of the subchannel allocated to the STA may be N (N=1, 2, 3, . . . ) times as large as the size of basic subchannel unit (i.e., a subchannel having a minimum size). In the example of FIG. 7, the size of a subchannel allocated to each STA is equal to the size of the basic subchannel unit. For example, a first subchannel may be allocated for PSDU transmission from an AP to STA1 and STA2, a second subchannel may be allocated for PSDU transmission from the AP to STA3 and STA4, a third subchannel may be allocated for PSDU transmission from the AP to STA5, and a fourth subchannel may be allocated for PSDU transmission from the AP to STA6.

While the term subchannel is used in the present disclosure, the term subchannel may be referred to as Resource Unit (RU) or subband. In particular, the terms like OFDMA subchannel, OFDMA RU, OFDMA subband can be used in embodiments for OFDMA in the present disclosure. Terms like a bandwidth of a subchannel, a number of tones (or subcarriers) allocated to a subchannel, a number of data tones (or data subcarriers) allocated to a subchannel can be used to express a size of a subchannel. A subchannel refers to a frequency band allocated to a STA and a basic subchannel unit refers to a basic unit used to represent the size of a subchannel. While the size of the basic subchannel unit is 5 MHz in the above example, this is purely exemplary. Thus, the basic subchannel unit may have a size of 2.5 MHz.

In FIG. 7, a plurality of HE-LTF elements are distinguished in the time and frequency domains. One HE-LTF element may correspond to one OFDM symbol in time domain and one subchannel unit (i.e., a subchannel bandwidth allocated to a STA) in frequency domain. The HE-LTF elements should be understood as logical units and the PHY layer does not necessarily operate in units of an HE-LTF element. In the following description, a HE-LTF element may be referred to shortly as a HE-LTF.

A HE-LTF symbol may correspond to a set of HE-LTF elements in one OFDM symbol in time domain and in one channel unit (e.g., 20 MHz) in frequency domain.

A HE-LTF section may correspond to a set of HE-LTF elements in one or more OFDM symbols in time domain and in one subchannel unit (i.e., a subchannel bandwidth allocated to a STA) in frequency domain.

A HE-LTF field may be a set of HE-LTF elements, HE-LTF symbols, or HE-LTF sections for a plurality of stations.

The L-STF field is used for frequency offset estimation and phase offset estimation, for preamble decoding at a legacy STA (i.e., a STA operating in a system such as IEEE 802.11 a/b/g/n/ac). The L-LTF field is used for channel estimation, for the preamble decoding at the legacy STA. The L-SIG field is used for the preamble decoding at the legacy STA and provides a protection function for PPDU transmission of a third-party STA (e.g., setting a NAV based on the value of a LENGTH field included in the L-SIG field).

HE-SIG-A (or HEW SIG-A) represents High Efficiency Signal A (or High Efficiency WLAN Signal A), and includes HE PPDU (or HEW PPDU) modulation parameters, etc. for HE preamble (or HEW preamble) decoding at a HE STA (or HEW STA). The parameters set included in the HEW SIG-A field may include one or more of Very High Throughput (VHT) PPDU modulation parameters transmitted by IEEE 802.11 ac stations, as listed in [Table 1] below, to ensure backward compatibility with legacy STAs (e.g., IEEE 802.11 ac stations).

TABLE 1

| Two parts of VHT-SIG-A | Bit | Field | Number of bits | Description |
|---|---|---|---|---|
| VHT-SIG-A1 | B0-B1 | BW | 2 | Set to 0 for 20 MHz, 1 for 40 MHz, 2 for 80 MHz, and 3 for 160 MHz and 80 + 80 MHz. |
| | B2 | Reserved | 1 | Reserved, Set to 1. |
| | B3 | STBC | 1 | For a VHT SU PPDU: Set to 1 if space time block coding is used and set to 0 otherwise. For a VHT MU PPDU: Set to 0. |
| | B4-B9 | Group ID | 6 | Set to the value of the TXVECTOR parameter GROUP_ID. A value of 0 or 63 indicates a VHT SU PPDU; otherwise, indicates a VHT MU PPDU. |
| | B10-B21 | NSTS/Partial AID | 12 | For a VHT MU PPDU: NSTS is divided into 4 user positions of 3 bits each. User position p, where $0 \le p \le 3$, uses bits B(10 + 3p) to B(12 + 3p). The number of space-time streams for user u are indicated at user position p = USER_POSITION[u] where u = 0, 1, ..., NUM_USERS − 1 and the notation A[b] denotes the value of array A at index b. Zero space-time streams are indicated at positions not listed in the USER_POSITION array. Each user position is set as follows: Set to 0 for 0 space-time streams Set to 1 for 1 space-time stream Set to 2 for 2 space-time streams Set to 3 for 3 space-time streams Set to 4 for 4 space-time streams Values 5-7 are reserved For a VHT SU PPDU: B10-B12 Set to 0 for 1 space-time stream Set to 1 for 2 space-time streams Set to 2 for 3 space-time streams Set to 3 for 4 space-time streams Set to 4 for 5 space-time streams Set to 5 for 6 space-time streams Set to 6 for 7 space-time streams Set to 7 for 8 space-time streams B13-B21 Partial AID: Set to the value of the TXVECTOR parameter PARTIAL_AID. Partial AID provides an abbreviated indication of the intended recipient(s) of the PSDU (see 9.17a). |
| | B22 | TXOP_PS_NOT_ALLOWED | 1 | Set to 0 by VHT AP if it allows non-AP VHT STAs in TXOP power save mode to enter Doze state during a TXOP. Set to 1 otherwise. The bit is reserved and set to 1 in VHT PPDUs transmitted by a non-AP VHT STA. |
| | B23 | Reserved | 1 | Set to 1 |
| VHT-SIG-A2 | B0 | Short GI | 1 | Set to 0 if short guard interval is not used in the Data field. Set to 1 if short guard interval is used in the Data field. |
| | B1 | Short GI $N_{SYM}$ Disambiguation | 1 | Set to 1 if short guard interval is used and $N_{SYM}$ mod 10 = 9; otherwise, set to 0. $N_{SYM}$ is defined in 22.4.3. |
| | B2 | SU/MU[0] Coding | 1 | For a VHT SU PPDU, B2 is set to 0 for BCC, 1 for LDPC For a VHT MU PPDU, if the MU[0] NSTS field is nonzero, then B2 indicates the coding used for user u with USER_POSITION[u] = 0; set to 0 for BCC and 1 for LDPC. If the MU[0] NSTS field is 0, then this field is reserved and set to 1. |
| | B3 | LDPC Extra OFDM Symbol | 1 | Ser to 1 if the LDPC PPDU encoding process (if an SU PPDU), or at least one LDPC user's PPDU encoding process (if a VHT MU PPDU), results in an extra OFDM symbol (or symbols) as described in 22.3.10.5.4 and 22.3.10.5.5. Set to 0 otherwise. |
| | B4-B7 | SU VHT-MCS/MU[1-3] Coding | 4 | For a VHT SU PPDU: VHT-MCS index For a VHT MU PPDU: If the MU[1] NSTS field is nonzero, then B4 indicates coding for user u with USER_POSITION[u] = 1: set to 0 for BCC, 1 for LDPC. If the MU[1] NSTS field is 0, then B4 is reserved and set to 1. If the MU[2] NSTS field is nonzero, then B5 indicates coding for user u with USER_POSITION[u] = 2: set to 0 for BCC, 1 for LDPC. If the MU[2] NSTS field is 0, then B5 is reserved and set to 1. If the MU[3] NSTS field is nonzero, then B6 indicates coding for user u with USER_POSITION[u] = 3: set to 0 for BCC, 1 for LDPC. If the MU[3] NSTS field is 0, then |

TABLE 1-continued

| Two parts of VHT-SIG-A | Bit | Field | Number of bits | Description |
|---|---|---|---|---|
| | | | | B6 is reserved and set to 1. |
| | | | | B7 is reserved and set to 1 |
| | B8 | Beamformed | 1 | For a VHT SU PPDU: |
| | | | | Set to 1 if a Beamforming steering matrix is applied to the waveform in an SU transmission as described in 20.3.11.11.2. set to 0 otherwise. |
| | | | | For a VHT MU PPDU: |
| | | | | Reserved and set to 1 |
| | | | | NOTE-If equal to 1 smoothing is not recommended. |
| | B9 | Reserved | 1 | Reserved and set to 1 |
| | B10-B17 | CRC | 8 | CRC calculated as in 20.3.9.4.4 with c7 in B10. Bits 0-23 of HT-SIG1 and bits 0-9 of HT-SIG2 are replaced by bits 0.23 of VHT-SIG-A1 and bits 0-9 of VHT-SIG-A2, respectively. |
| | B18-B23 | Tail | 6 | Used to terminate the trellis of the convolutional decoder. Set to 0. |

[Table 1] illustrates fields, bit positions, numbers of bits, and descriptions included in each of two parts, VHT-SIG-A1 and VHT-SIG-A2, of the VHT-SIG-A field defined by the IEEE 802.11 ac standard. For example, a BW (BandWidth) field occupies two Least Significant Bits (LSBs). B0 and B1 of the VHT-SIG-A1 field and has a size of 2 bits. If the 2 bits are set to 0, 1, 2, or 3, the BW field indicates 20 MHz. 40 MHz. 80 MHz, or 160 and 80+80 MHz. For details of the fields included in the VHT-SIG-A field, refer to the IEEE 802.11 ac-2013 technical specification. In the HE PPDU frame format of the present invention, the HE-SIG-A field may include one or more of the fields included in the VHT-SIG-A field, and it may provide backward compatibility with IEEE 802.11 ac stations.

Figure 8:
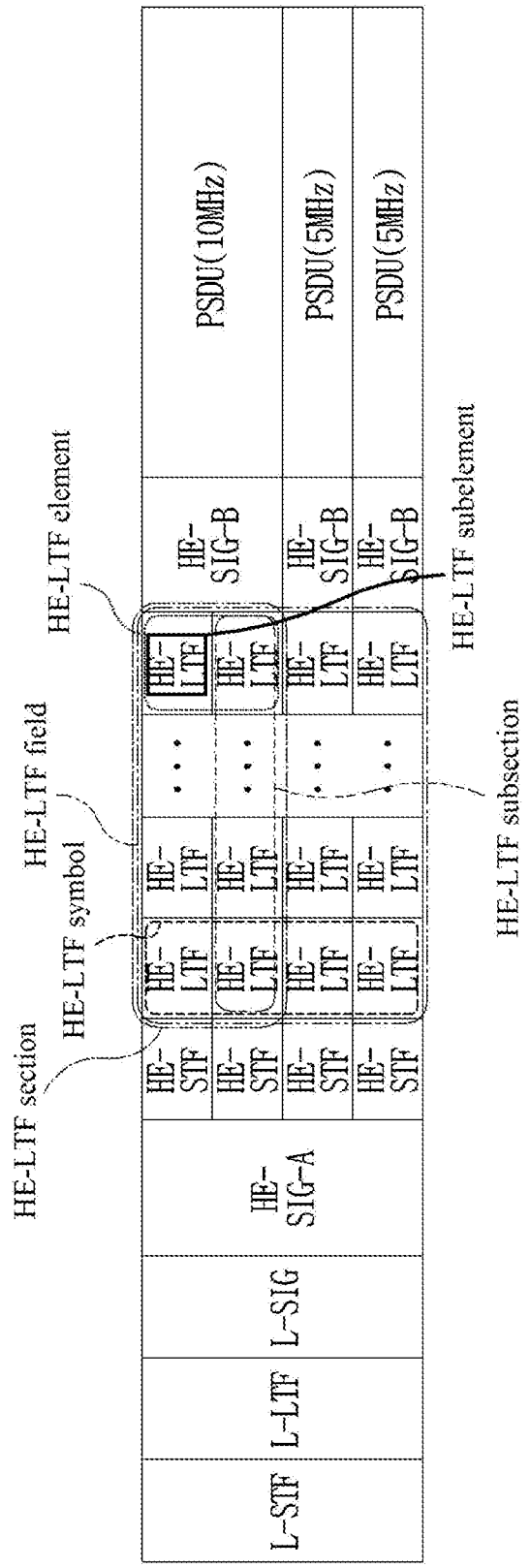
FIG. 8 depicts subchannel allocation in a HE PPDU frame format according to the present invention.

FIG. 8 depicts subchannel allocation in the HE PPDU frame format according to the present invention.

In the example of FIG. 8, it is assumed that information indicating subchannels to which STAs are allocated in HE PPDU indicates that a subchannel of 0 MHz is allocated to STA1 (i.e., no subchannel is allocated), a subchannel of 5 MHz is allocated to each of STA2 and STA3, and a subchannel of 10 MHz is allocated to STA4.

In the example of FIG. 8, an L-STF, an L-LTF, an L-SIG, and a HE-SIG-A may be transmitted per channel (e.g., 20 MHz), a HE-STF and a HE-LTF may be transmitted on each of subchannels being basic subchannel units (e.g., 5 MHz), and a HE-SIG-B SIG-B and a PSDU may be transmitted on each of subchannels allocated to STAs. A subchannel allocated to a STA has a size required for PSDU transmission to the STA. The size of the subchannel allocated to the STA may be an N (N=1, 2, 3, . . . ) multiple of the size of the basic subchannel unit (i.e., a minimum-size subchannel unit). In the example of FIG. 8, the size of a subchannel allocated to STA2 is equal to that of the basic subchannel unit, the size of a subchannel allocated to STA3 is equal to that of the basic subchannel unit, and the size of a subchannel allocated to STA4 is twice larger than that of the basic subchannel unit.

FIG. 8 illustrates a plurality of HE-LTF elements and a plurality of HE-LTF subelements which are distinguished in the time and frequency domains. One HE-LTF element may correspond to one OFDM symbol in the time domain and one subchannel unit (i.e., the bandwidth of a subchannel allocated to a STA) in the frequency domain. One HE-LTF subelement may correspond to one OFDM symbol in the time domain and one basic subchannel unit (e.g. 5 MHz) in the frequency domain. In the example of FIG. 8, one HE-LTF element includes one HE-LTF subelement in the 5-MHz subchannel allocated to STA2 or STA3. On the other hand, one HE-LTF element includes two HE-LTF subelements in the third subchannel, i.e., 10-MHz subchannel, allocated to STA4. It is to be understood that a HE-LTF element and a HE-LTF subelement are logical units and the PHY layer does not always operate in units of a HE-LTF element or HE-LTF subelement.

A HE-LTF symbol may correspond to a set of HE-LTF elements in one OFDM symbol in the time domain and one channel unit (e.g. 20 MHz) in the frequency domain. That is, one HE-LTF symbol may be divided into HE-LTF elements by a subchannel width allocated to a STA and into HE-LTF subelements by the width of the basic subchannel unit in the frequency domain.

A HE-LTF section may correspond to a set of HE-LTF elements in one or more OFDM symbols in the time domain and one subchannel unit (i.e. the bandwidth of a subchannel allocated to a STA) in the frequency domain. A HE-LTF subsection may correspond to a set of HE-LTF elements in one or more OFDM symbols in the time domain and one basic subchannel unit (e.g., 5 MHz) in the frequency domain. In the example of FIG. 8, one HE-LTF section includes one HE-LTF subsection in the 5-MHz subchannel allocated to STA2 or STA3. On the other hand, one HE-LTF section includes two HE-LTF subsections in the third subchannel, i.e., 10-MHz subchannel, allocated to STA4.

A HE-LTF field may correspond to a set of HE-LTF elements (or subelements), HE-LTF symbols, or HE-LTF sections (or subsections) for a plurality of stations.

For the afore-described HE PPDU transmission, subchannels allocated to a plurality of HE STAs may be contiguous in the frequency domain. In other words, for HE PPDU transmission, the subchannels allocated to the HE STAs may be sequential and any intermediate one of the subchannels of one channel (e.g., 20 MHz) may not be allowed to be unallocated or empty. Referring to FIG. 7, if one channel includes four subchannels, it may not be allowed to keep the third subchannel unallocated and empty, while the first, second, and fourth subchannels are allocated to STAs. However, the present invention does not exclude non-allocation of a intermediate subchannel of one channel to a STA.

Figure 9:
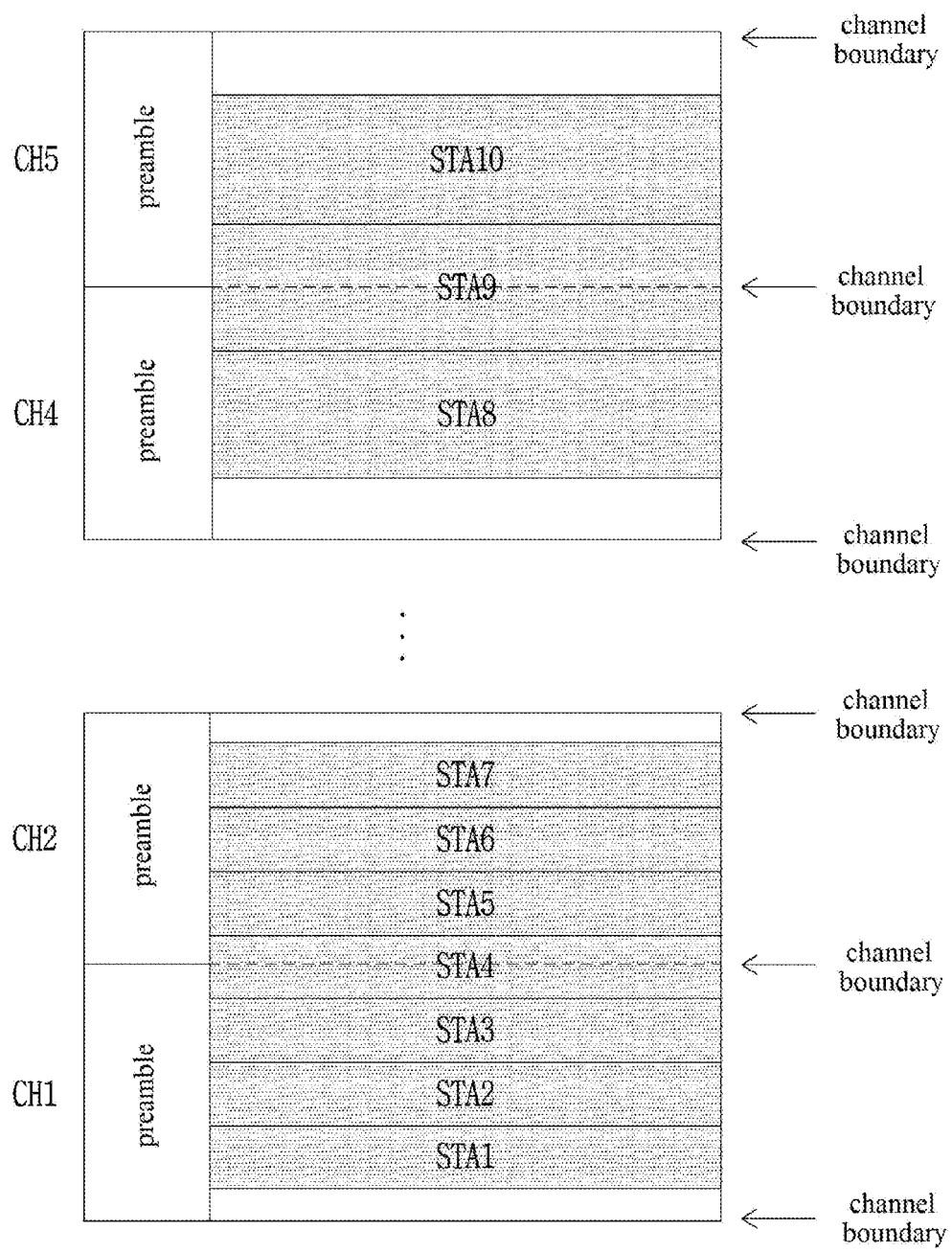
FIG. 9 depicts a subchannel allocation method according to the present invention.

FIG. 9 depicts a subchannel allocation method according to the present invention.

In the example of FIG. 9, a plurality of contiguous channels (e.g., 20-MHz-bandwidth channels) and boundaries of the plurality of contiguous channels are shown. In FIG. 9, a preamble may correspond to an L-STF, an L-LTF, an L-SIG, and a HE-SIG-A as illustrated in the examples of FIGS. 7 and 8.

A subchannel for each HE STA may be allocated only within one channel, and may not be allocated with partially overlapping between a plurality of channels. That is, if there are two contiguous 20-MHz channels CH1 and CH2, subchannels for STAs paired for MU-MIMO-mode or OFDMA-mode transmission may be allocated either within CH1 or within CH2, and it may be prohibited that one part of a subchannel exists in CH1 and another part of the subchannel exists in CH2. This means that one subchannel may not be allocated with crossing a channel boundary. From the perspective of RUs supporting the MU-MIMO or OFDMA mode, a bandwidth of 20 MHz may be divided into one or more RUs, and a bandwidth of 40 MHz may be divided into one or more RUs in each of two contiguous 20-MHz bandwidths, and no RU is allocated with crossing the boundary between two contiguous 20-MHz bandwidths.

As described above, it is not allowed that one subchannel belongs to two or more 20-Hz channels. Particularly, a 2.4-GHz OFDMA mode may support a 20-MHz OFDMA mode and a 40-MHz OFDMA mode. In the 2.4-GHz OFDMA mode, it may not be allowed that one subchannel belongs to two or more 20-MHz channels.

FIG. 9 is based on the assumption that subchannels each having the size of a basic subchannel unit (e.g., 5 MHz) in CH1 and CH2 are allocated to STA1 to STA7, and subchannels each having double the size (e.g., 10 MHz) of the basic subchannel unit in CH4 and CH5 are allocated to STA8, STA9, and STA10.

As illustrated in the lower part of FIG. 9, although a subchannel allocated to STA1, STA2, STA3, STA5, STA6, or STA7 is fully overlapped only with one channel (i.e., without crossing the channel boundary, or belonging only to one channel), a subchannel allocated to STA4 is partially overlapped with the two channels (i.e., crossing the channel boundary, or belonging to the two channels). In the forgoing example of the present invention, the subchannel allocation to STA4 is not allowed.

As illustrated in the upper part of FIG. 9, although a subchannel allocated to STA8 or STA10 is fully overlapped only with one channel (i.e., crossing the channel boundary, or belonging only to one channel), a subchannel allocated to STA9 is partially overlapped with two channels (i.e., crossing the channel boundary, or belonging to the two channels). In the forgoing example of the present invention, the subchannel allocation to STA9 is not allowed.

On the other hand, it may be allowed to allocate a subchannel partially overlapped between a plurality of channels (i.e., crossing the channel boundary, or belonging to two channels). For example, in SU-MIMO mode transmission, a plurality of contiguous channels may be allocated to a STA and any of one or more subchannels allocated to the STA may cross the boundary between two contiguous channels.

While the following description is given with an assumption that one subchannel has a channel bandwidth of 5 MHz in one channel having a channel bandwidth of 20 MHz, this is provided to simplify the description of the principle of the present invention and thus should not be construed as limiting the present invention. For example, the bandwidths of a channel and a subchannel may be defined or allocated as values other than the above examples. In addition, a plurality of subchannels in one channel may have the same or different channel widths.

FIG. 10 depicts the starting and ending points of a HE-LTF field in the HE PPDU frame format according to the present invention.

To support the MU-MIMO mode and the OFDMA mode, the HE PPDU frame format according to the present invention may include, in the HE-SIG-A field, information about the number of spatial streams to be transmitted to a HE STA allocated to each subchannel.

If MU-MIMO-mode or OFDMA-mode transmission is performed to a plurality of HE STAs on one subchannel, the number of spatial streams to be transmitted to each of the HE STAs may be provided in the HE-SIG-A or HE-SIG-B field, which will be described later in detail.

FIG. 10 is based on the assumption that a first 5-MHz subchannel is allocated to STA1 and STA2 and two spatial streams are transmitted to each STA in a DL MU-MIMO or OFDMA mode (i.e., a total of four spatial streams are transmitted on one subchannel). For this purpose, a HE-STF, a HE-LTF, a HE-LTF, a HE-LTF, a HE-LTF, and a HE-SIG-B follow the HE-SIG-A field on the subchannel. The HE-STF is used for frequency offset estimation and phase offset estimation for the 5-MHz subchannel. The HE-LTFs are used for channel estimation for the 5-MHz subchannel. Since the subchannel carries four spatial streams, as many HE-LTFs (i.e., HE-LTF symbols or HE-LTF elements in a HE-LTF section) as the number of the spatial streams, that is, four HE-LTFs are required to support MU-MIMO transmission.

According to an example of the present invention, a relationship between a number of total spatial streams transmitted in one subchannel and a number of HE-LTF are listed in [Table 2].

TABLE 2

| Total number of spatial streams transmitted on one subchannel | Number of HE-LTFs |
| --- | --- |
| 1 | 1 |
| 2 | 2 |
| 3 | 4 |
| 4 | 4 |
| 5 | 6 |
| 6 | 6 |
| 7 | 8 |
| 8 | 8 |

Referring to [Table 2], if one spatial stream is transmitted on one subchannel, at least one HE-LTF needs to be transmitted on the subchannel. If an even number of spatial streams are transmitted on one subchannel, at least as many HE-LTFs as the number of the spatial streams need to be transmitted. If an odd number of spatial streams greater than one are transmitted on one subchannel, at least as many HE-LTFs as a number of adding 1 to the number of the spatial streams need to be transmitted.

Referring to FIG. 10 again, it is assumed that the second 5-MHz subchannel is allocated to STA3 and STA4 and one spatial streams per STA is transmitted in the DL MU-MIMO or OFDMA mode (i.e., a total of two spatial streams are transmitted on one subchannel). In this case, two HE-LTFs need to be transmitted on the second subchannel, however, in the example of FIG. 10, a HE-STF, a HE-LTF, a HE-LTF, a HE-LTF, a HE-LTF, and a HE-SIG-B follow the HE-SIG-A field on the subchannel (i.e., four HE-LTFs are transmitted). This is for setting the same starting time of PSDU transmission for subchannels allocated to other STAs paired with STA3 and STA4 for MU-MIMO transmission. If only two HE-LTFs are transmitted on the second subchannel, PSDUs are transmitted at different time points on the first and second subchannels. PSDU transmission on each subchannel at a different time point results in discrepancy between OFDM symbol timings of subchannels, thereby no orthogonality is maintained. To overcome this problem, an additional constraint need to be imposed for HE-LTF transmission.

Basically, transmission of as many HE-LTFs as required is sufficient in an SU-MIMO or non-OFDMA mode. However, timing synchronization (or alignment) with fields transmitted on subchannels for other paired STAs is required in the MU-MIMO or OFDMA mode. Accordingly, the numbers of HE-LTFs may be determined for all other subchannels based on a subchannel having the maximum number of streams in MU-MIMO-mode or OFDMA-mode transmission.

Specifically, the numbers of HE-LTFs may be determined for all subchannels according to the maximum of the numbers of HE-LTFs (HE-LTF symbols or HE-LTF elements in a HE-LTF section) required according to the total numbers of spatial streams transmitted on each subchannel, for a set of HE STAs allocated to each subchannel. A "set of HE STAs allocated to each subchannel" is one HE STA in the SU-MIMO mode, and a set of HE STAs paired across a plurality of subchannels in the MU-MIMO mode. The 'number of spatial streams transmitted on each subchannel' is the number of spatial streams transmitted to one HE STA in the SU-MIMO mode, and the number of spatial streams transmitted to a plurality of HE STAs paired on the subchannel in the MU-MIMO mode.

That is, it may be said that a HE-LTF field starts at the same time point and ends at the same time point in a HE PPDU for all users (i.e. HE STAs) in MU-MIMO-mode or OFDMA-mode transmission. Or it may be said that the lengths of HE-LTF sections are equal on a plurality of subchannels for all users (i.e. HE STAs) in MU-MIMO-mode or OFDMA-mode transmission. Or it may be said that the number of HE-LTF elements included in each HE-LTF section is equal on a plurality of subchannels for all users (i.e. HE STAs) in MU-MIMO-mode or OFDMA-mode transmission. Accordingly, PSDU transmission timings may be synchronized among a plurality of subchannels for all HE STAs in MU-MIMO-mode or OFDMA-mode transmission.

As described above, the number of HE-LTF symbols (refer to FIG. 7) may be 1, 2, 4, 6, or 8 in HE PPDU transmission in the MU-MIMO or OFDMA mode, determined according to the maximum of the numbers of spatial streams on each of a plurality of subchannels. A different number of spatial streams may be allocated to each of a plurality of subchannels, and the number of spatial streams allocated to one subchannel is the number of total spatial streams for all users allocated to the subchannel. That is, the number of HE-LTF symbols may be determined according to the number of spatial streams allocated to a subchannel having a maximum number of spatial streams by comparing the number of total spatial streams for all users allocated to one of a plurality of subchannels with the number of total spatial streams for all users allocated to another subchannel.

Specifically, in HE PPDU transmission in the OFDMA mode, the number of HE-LTF symbols may be 1, 2, 4, 6, or 8, determined based on the number of spatial streams transmitted in a subchannel having a maximum number of spatial streams across a plurality of subchannels. Further, in HE PPDU transmission in the OFDMA mode, the number of HE-LTF symbols may be determined based on whether the number of spatial streams transmitted in a subchannel having a maximum number of spatial streams across a plurality of subchannels is odd or even (refer to [Table 2]). That is, in HE PPDU transmission in the OFDMA mode, when the number (e.g., K) of spatial streams transmitted in a subchannel having a maximum number of spatial streams across a plurality of subchannels is an even number, the number of HE-LTF symbols may be equal to K. In HE PPDU transmission in the OFDMA mode, when the number, K, of spatial streams transmitted in a subchannel having a maximum number of spatial streams across a plurality of subchannels is an odd number greater than one, the number of HE-LTF symbols may be equal to K+1.

When only one STA is allocated to one subchannel in OFDMA mode (i.e., OFDMA mode without using MU-MIMO), a subchannel having a maximum number of spatial streams across a plurality of subchannels may be determined by the number of spatial streams for a STA allocated to each subchannel. When more than one STA is allocated to one subchannel in OFDMA mode (i.e., OFDMA mode using MU-MIMO), a subchannel having a maximum number of spatial streams across a plurality of subchannels may be determined by the number of STAs allocated to each subchannel and the number of spatial streams for each STA allocated to each subchannel (e.g., if STA1 and STA2 are allocated to one subchannel, sum of the number of spatial streams for STA1 and the number of spatial streams for STA2).

When transmitting a HE PPDU frame in the MU-MIMO or OFDMA mode, a transmitter may generate P (P is an integer equal to or larger than 1) HE-LTF symbols (refer to FIG. 7) and transmit a HE PPDU frame including at least the P HE-LTF symbols and a Data field to a receiver. The HE PPDU frame may be divided into Q subchannels in the frequency domain (Q is an integer equal to or larger than 2). Each of the P HE-LTF symbols may be divided into Q HE-LTF elements corresponding to the Q subchannels in the frequency domain. That is, the HE PPDU may include P HE-LTF elements on one subchannel (herein, the P HE-LTF elements may belong to one HE-LTF section on the subchannel).

As described above, the number of HE-LTF elements (i.e., P) in one of the Q subchannels may be equal to the number of HE-LTF elements (i.e. P) of another subchannel. Also, the number of HE-LTF elements (i.e., P) included in a HE-LTF section in one of the Q subchannels may be equal to the number of HE-LTF elements (i.e. P) included in a HE-LTF section in another subchannel. The HE-LTF section of one of the Q subchannels may start and end at the same time points as the HE-LTF section of another subchannel. Also, the HE-LTF sections may start and end at the same time points across the Q subchannels (i.e., across all users or stations).

Referring to FIG. 10 again, the third 5-MHz subchannel is allocated to STA5 and one spatial stream is transmitted on the subchannel in SU-MIMO (considering all subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

The fourth 5-MHz subchannel is allocated to STA6 and one spatial stream is transmitted on the subchannel in SU-MIMO (considering all other subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

In the example of FIG. 10, the remaining two HE-LTFs except two HE-LTFs required for channel estimation of STA3 and STA4 on the second subchannel, the remaining three HE-LTFs except one HE-LTF required for channel estimation of STA5 on the third subchannel, and the remaining three HE-LTFs except one HE-LTF required for channel estimation of STA6 on the fourth subchannel may be said to be placeholders that are actually not used for channel estimation at the STAs.

FIG. 11 depicts a HE-SIG-B field and a HE-SIG-C field in the HE PPDU frame format according to the present invention.

To effectively support MU-MIMO-mode or OFDMA-mode transmission in the HE PPDU frame format according to the present invention, independent signaling information may be transmitted on each subchannel. Specifically, a different number of spatial streams may be transmitted to each of a plurality of HE STAs that receive an MU-MIMO-mode or OFDMA-mode transmission simultaneously. Therefore, information about the number of spatial streams to be transmitted should be indicated to each HE STA.

Information about the number of spatial streams on one channel may be included in, for example, a HE-SIG-A field. A HE-SIG-B field may include spatial stream allocation information about one subchannel. Also, a HE-SIG-C field may be transmitted after transmission of HE-LTFs, including MCS information about a PSDU and information about the length of the PSDU, etc.

With reference to the foregoing examples of the present invention, mainly the features of a HE PPDU frame structure applicable to a DL MU-MIMO-mode or OFDMA-mode transmission that an AP transmits simultaneously to a plurality of STAs have been described. Now, a description will be given of the features of a HE PPDU frame structure applicable to a UL MU-MIMO-mode or OFDMA-mode transmission that a plurality of STAs transmits simultaneously to an AP.

The above-described various examples of structures of the HE PPDU frame format supporting MU-MIMO-mode or OFDMA-mode transmission are not applicable only to DL but also applicable UL. For example, the above-described exemplary HE PPDU frame formats may also be used for a UL HE PPDU transmission that a plurality of STAs simultaneously transmits to a single AP.

However, in the case of a DL MU-MIMO-mode or OFDMA-mode HE PPDU transmission that an AP simultaneously transmits to a plurality of STAs, the transmission entity, AP has knowledge of the number of spatial streams transmitted to a HE STA allocated to each of a plurality of subchannels. Therefore, the AP may include, in a HE-SIG-A field or a HE-SIG-B field, information about the total number of spatial streams transmitted across a channel, a maximum number of spatial streams (i.e., information being a basis of the number of HE-LTF elements (or the starting point and ending point of a HE-LTF section) on each subchannel), and the number of spatial streams transmitted on each subchannel. In contrast, in the case of a UL MU-MIMO-mode or OFDMA-mode HE PPDU transmission that a plurality of STAs simultaneously transmits to an AP, each STA being a transmission entity may be aware only of the number of spatial streams in a HE PSDU that it will transmit, without knowledge of the number of spatial streams in a HE PSDU transmitted by another STA paired with the STA. Accordingly, the STA may determine neither the total number of spatial streams transmitted across a channel nor a maximum number of spatial streams.

To solve this problem, a common parameter (i.e., a parameter applied commonly to STAs) and an individual parameter (a separate parameter applied to an individual STA) may be configured as follows in relation to a UL HE PPDU transmission.

For simultaneous UL HE PPDU transmissions from a plurality of STAs to an AP, a protocol may be designed in such a manner that the AP sets a common parameter or individual parameters (common/individual parameters) for the STAs for the UL HE PPDU transmissions and each STA operates according to the common/individual parameters. For example, the AP may transmit a trigger frame (or polling frame) for a UL MU-MIMO-mode or OFDMA-mode transmission to a plurality of STAs. The trigger frame may include a common parameter (e.g., the number of spatial streams across a channel or a maximum number of spatial streams) and individual parameters (e.g., the number of spatial streams allocated to each subchannel), for the UL MU-MIMO-mode or OFDMA-mode transmission. As a consequence, a HE PPDU frame format applicable to a UL MU-MIMO or OFDMA mode may be configured without a modification to an exemplary HE PPDU frame format applied to a DL MU-MIMO or OFDMA mode. For example, each STA may configure a HE PPDU frame format by including information about the number of spatial streams across a channel in a HE-SIG-A field, determining the number of HE-LTF elements (or the starting point and ending point of a HE-LTE section) on each subchannel according to the maximum number of spatial streams, and including information about the number of spatial streams for the individual STA in a HE-SIG-B field.

Alternatively, if the STAs operate always according to the common/individual parameters received in the trigger frame from the AP, each STA does not need to indicate the common/individual parameters to the AP during a HE PPDU transmission. Therefore, this information may not be included in a HE PPDU. For example, each STA may have only to determine the total number of spatial streams, the maximum number of spatial streams, and the number of spatial streams allocated to individual STA, as indicated by the AP, and configure a HE PPDU according to the determined numbers, without including information about the total number of spatial streams or the number of spatial streams allocated to the STA in the HE PPDU.

On the other hand, if the AP does not provide common/individual parameters in a trigger frame, for a UL MIMO-mode or OFDMA-mode HE PPDU transmission, the following operation may be performed.

Common transmission parameters (e.g., channel Band-Width (BW) information, etc.) for simultaneously transmitted HE PSDUs may be included in HE-SIG-A field, but parameters that may be different for individual STAs (e.g., the number of spatial streams, an MCS, and whether STBC is used or not, for each individual STA) may not be included in HE-SIG-A field. Although the individual parameters may be included in HE-SIG-B field, information about the number of spatial streams and information indicating whether STBC is used or not, need to be transmitted before a HE-LTF field because the number of spatial streams and the information indicating whether STBC is used or not are significant to determination of configuration information about a preamble and a PSDU in a HE PPDU frame format (e.g., the number of HE-LTF elements is determined according to a combination of the number of spatial streams and the information indicating whether STBC is used or not). For this purpose, a HE PPDU frame format as illustrated in FIG. 12 may be used for a UL HE PPDU transmission.

Figure 12:
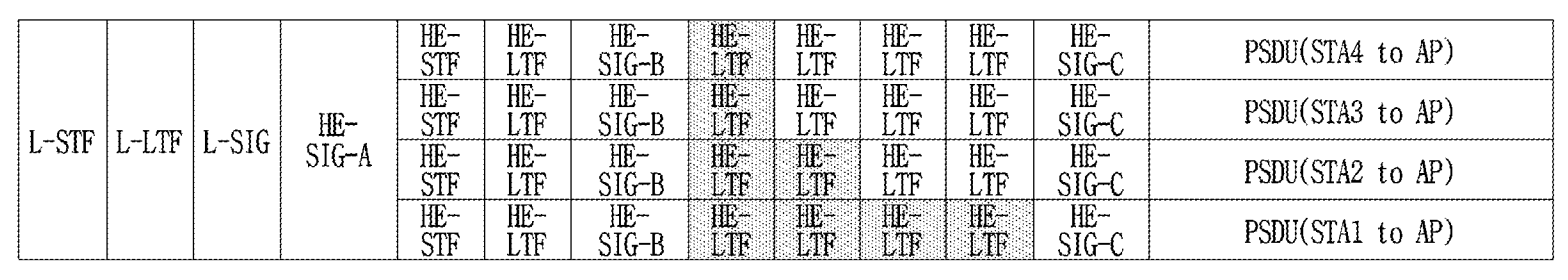

FIG. 12 depicts another exemplary HE PPDU frame format according to the present invention. The HE PPDU frame format illustrated in FIG. 12 is characterized in that a structure of HE-SIG-A, HE-SIG-B, and HE-SIG-C fields similar to in FIG. 10 is used for a UL PPDU transmission.

As described before, if a UL MU-MIMO-mode or OFDMA-mode transmission is performed by triggering of an AP (according to common/individual parameters provided by the AP), an individual STA may not need to report an individual parameter to the AP. In this case, one or more of a HE-SIG-B field, a HE-SIG-C field, and a first HE-LTF element (i.e., a HE-LTF between a HE-STF field and a HE-SIG-B field) illustrated in FIG. 12 may not exist. In this case, a description of each field given below may be understood that it is applied only in the presence of the field.

In the example of FIG. 12, a HE-SIG-A field is transmitted per channel (i.e., per 20-MHz channel) and may include transmission parameters common to simultaneously transmitted HE PSDUs. Since the same information is transmitted in up to HE-SIG-A fields in UL PPDUs transmitted by HE STAs allocated to subchannels, the AP may receive the same signals from the plurality of STAs successfully.

A HE-SIG-B field is transmitted per subchannel in one channel. The HE-SIG-B field may have an independent parameter value according to the transmission characteristics of a HE PSDU transmitted on each subchannel. The HE-SIG-B field may include spatial stream allocation information and information indicating whether STBC is used or not, for each subchannel. If MU-MIMO is applied to a subchannel (i.e., if a plurality of STAs perform transmission on a subchannel), the HE-SIG-B field may include a common parameter for the plurality of STAs paired on the subchannel.

A HE-SIG-C field is transmitted on the same subchannel as the HE-SIG-B field and may include information about an MCS and a packet length. If MU-MIMO is applied to a subchannel (i.e., if a plurality of STAs perform transmission on a subchannel), the HE-SIG-C field may include respective individual parameters for each of the plurality of STAs paired on the subchannel.

Similarly to DL MU-MIMO-mode or OFDMA-mode HE PPDU transmission, transmissions of PSDUs may start at different time points on subchannels in UL MU-MIMO-mode or OFDMA-mode HE PPDU transmission, and if OFDM symbols are not aligned accordingly, then the implementation complexity of an AP that receives a plurality of PSDUs increased. To solve this problem. 'the number of HE-LTFs may be determined for all subchannels according to the maximum of the numbers of HE LTFs required according to the total numbers of spatial streams transmitted on each subchannel for a set of HE STAs allocated to each of subchannels' as described with reference to the example of FIG. 10.

This feature may mean that the HE-LTF field start at the same time point and end at the same time point across all users (i.e., HE STAs) in UL MU-MIMO-mode or OFDMA-mode transmission. Or it may be said that the HE-LTF sections of a plurality of subchannels have the same length across all HE STAs in UL MU-MIMO-mode or OFDMA-mode transmission. Or it may be said that each of the HE-LTF sections of a plurality of subchannels includes the same number of HE-LTF elements across all HE STAs in UL MU-MIMO-mode or OFDMA-mode transmission. Therefore, PSDU transmission timings are synchronized between a plurality of subchannels across all HE STAs in UL MU-MIMO-mode or OFDMA-mode transmission.

As described before, a plurality of STAs may simultaneously transmit PSDUs in a HE PPDU frame format to an AP on subchannels allocated to the STAs (i.e., referred to as UL MU-MIMO or OFDMA transmission or "UL MU transmission"), and a plurality of STAs may simultaneously receive a PSDU in a HE PPDU frame format from an AP on subchannels allocated to the STAs (i.e., referred to as DL MU-MIMO or OFDMA transmission or "DL MU transmission").

Figure 13:
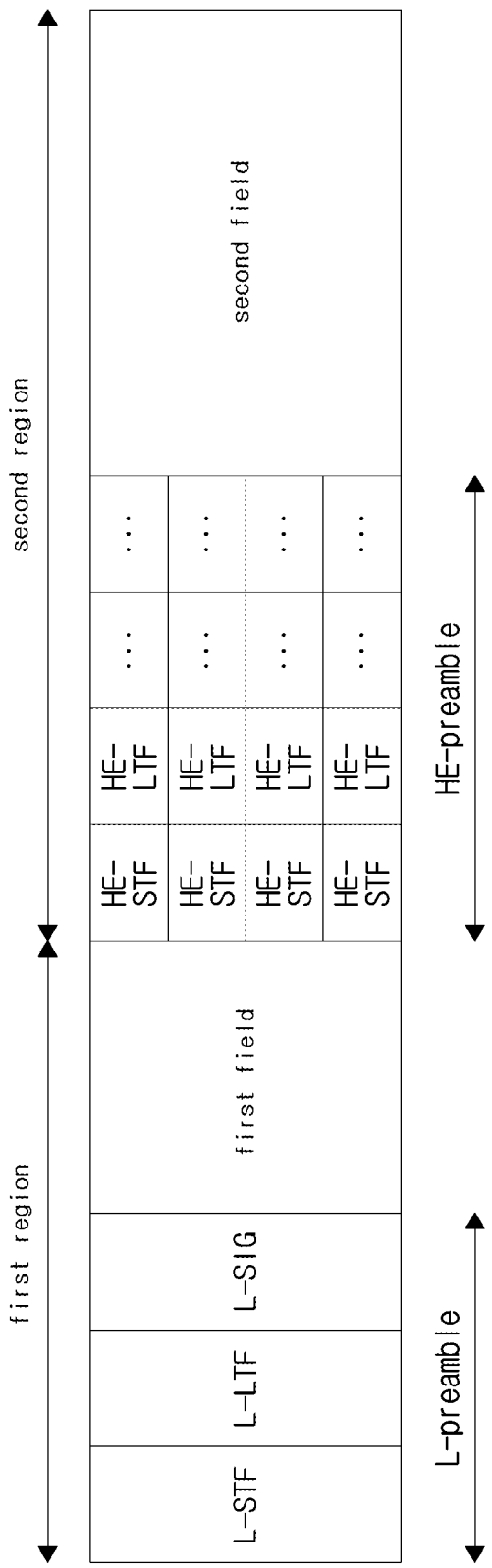
FIG. 13 depicts another exemplary HE PPDU frame format according to the present invention.

FIG. 13 depicts another exemplary HE PPDU frame format according to the present invention.

The exemplary HE PPDU format illustrated in FIG. 13 may be used for UL SU or MU transmission, or DL SU or MU transmission.

In FIG. 13, it is assumed that a HE PPDU frame is divided into two regions (i.e., a first region and a second region) having different types or properties. Or it may be said that the HE PPDU frame of FIG. 13 is configured by aggregating the first and second regions. Herein, the term region is purely exemplary and thus may be replaced with the terms, portion, part, period, field, and unit.

For example, the first region may be configured to be decodable by all STAs including a legacy STA and a HE STA, and the second region may be configured to be decodable by a HE STA. For example, the first region may not support UL/DL OFDMA transmission, whereas the second region may support UL/DL OFDMA transmission. Accordingly, the first region may be referred to as a legacy region and the second region may be referred to as a HE region.

For example, the first region may be a region including 64 FFT-based symbols. That is, the first region may be configured to include 4.0-μs OFDM symbols based on 64 FFT. Except for a guard interval, the first region may be configured to include 3.2-μs OFDM symbols based on 64 FFT. The term 64 FFT-based symbol is generally used with respect to a channel bandwidth of 20 MHz. If the term 64 FFT-based symbol is used irrespective of the channel bandwidth, it may mean a symbol having a symbol duration of 3.2 μs and a subcarrier spacing of 312.5 kHz.

For example, the second region may be a region including 256 FFT-based symbols. That is, the second region may be configured to include 16-μs OFDM symbols based on 256 FFT. Except for a guard interval, the second region may be configured to include 12.8-μs OFDM symbols based on 256 FFT. The term 256 FFT-based symbol is generally used with respect to a channel bandwidth of 20 MHz. If the term 256 FFT-based symbol is used irrespective of the channel bandwidth, it may mean a symbol having a symbol duration of 12.8 μs and a subcarrier spacing of 78.125 kHz.

Fields (e.g., L-STF, L-LTF, and L-SIG) expressed as a legacy preamble (L-preamble) in the first region have been described before with reference to FIGS. 7 to 12. Likewise, fields (e.g., H-STF, H-LTF, and H-SIG) expressed as a HE-preamble in the second region have been described before with reference to FIGS. 7 to 12.

A first field following the L-preamble of the first region (i.e. before the HE-preamble) may be configured in a legacy PPDU format. For example, the first field may correspond to a DATA field of a legacy PPDU frame (refer to FIG. 6). A PSDU included in the DATA field of the legacy PPDU frame may include one or more MPDUs and each MPDU may be configured as defined by various MAC frame formats (e.g., a control frame (such as an RTS, a CTS, an ACK, a block ACK, etc.), a management frame (such as a beacon frame, a probe request/response frame, etc.), and a data frame).

The first field does not necessarily include only a legacy PSDU. As described before with reference to FIGS. 7 to 12, the first field may include a specific HE-SIG field. For example, the first field may include a field that provides control information needed for interpretation of the second region (e.g., a PPDU part configured in a HE format).

As described above, the information included in the first field may have the property of transmission for a single user (e.g., unicast or SU transmission) or the property of transmission for multiple users (e.g., broadcast, multicast, or MU transmission). Further, the first field may have a different property depending on whether the type of information included in the first field is control frame, management frame, or data frame. Since the property of information included in the first field may be different, the duration of the first field (i.e., the time-domain length or number of OFDM symbols of the first field) may be not fixed but variable.

The first region may span from the L-STF to the first field and the second region may span from the HE-STF to the second field. The HE-STF of the second region may follow the first field of the first region (i.e., successively in time). That is, the first field may be interposed between the L-SIG of the L-preamble and the HE-STF of the HE-preamble in the second region.

A second field following the HE-preamble of the second region may include PSDUs in various HE frame formats (e.g., control frame, data frame, and management frame). While not shown explicitly in the example of FIG. 13, the second field of the HE frame format may be configured to include a plurality of subchannels within one channel (i.e., a channel having a bandwidth of, for example, 20 MHz, 40 MHz, 80 MHz, or 160 MHz).

Further, the information included in the first field may be the counterpart of the information included in the second field. For example, the first field may include a legacy control frame and the second field may include a HE control frame as in the example of FIG. 14. Or the information included in the first field may be related to the information included in the HE-preamble or the second field. For example, a specific HE-SIG field included in the first field may provide control information about the HE-preamble or the second field. Or the information included in the first field and the information included in the second field may neither correspond to each other nor be related to each other. Rather, the information included in the first field and the information included in the second field may be different from each other.

The HE PPDU frame format illustrated in the example of FIG. 13 may be newly defined and used to achieve an object that a legacy WLAN cannot fulfil (e.g., an increase in a transmission distance in an outdoor WLAN environment). The newly defined HE PPDU frame format may include a legacy region (i.e., the first region in FIG. 13) so that a legacy STA (e.g., an STA conforming to the IEEE 802.11a/g/n/ac standard) may decode the legacy region. In addition, the HE PPDU format may include a HE region (i.e., the second region in FIG. 13) for transmission of a control frame, a management frame, and a data frame which are newly defined in the HE WLAN. Therefore, the HE PPDU frame format of the present invention may support both compatibility with legacy STAs and a new operation in the HE WLAN. Further, a management frame, a control frame, and a data frame may be transmitted once in each of the legacy format and the HE format (i.e., overlapped transmission despite different formats), or in an aggregate of different formats, according to the HE PPDU frame format of the present invention.

Figure 14:
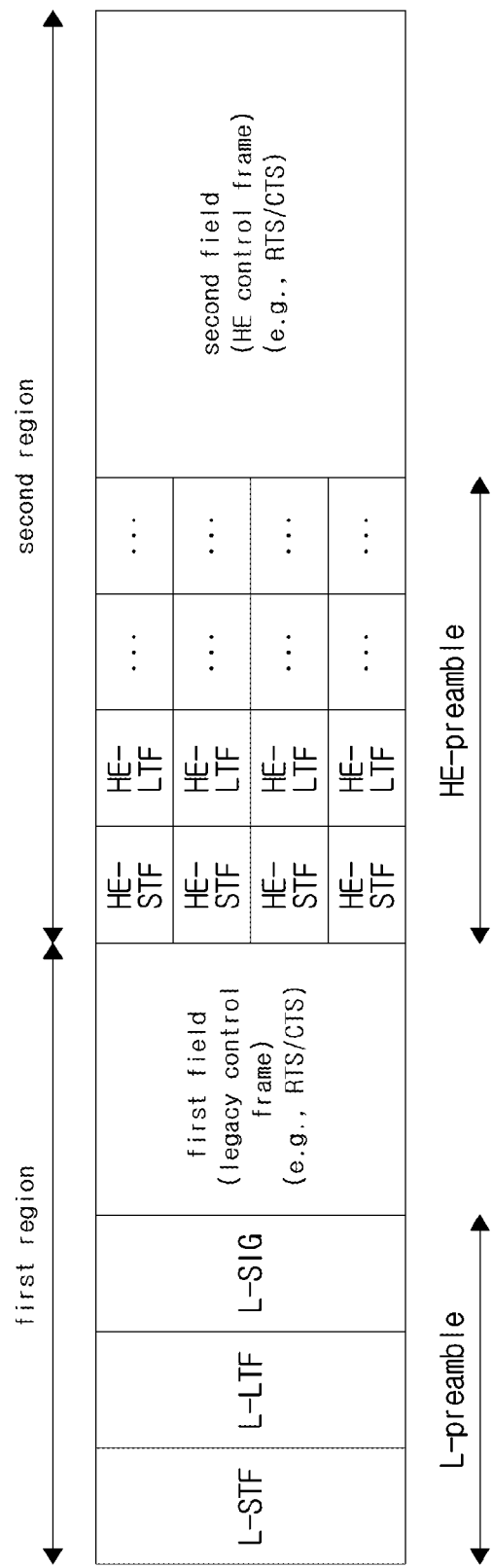
FIGS. 14, 15, and 16 depict the HE PPDU frame format according to examples of the present invention.
Figure 15:
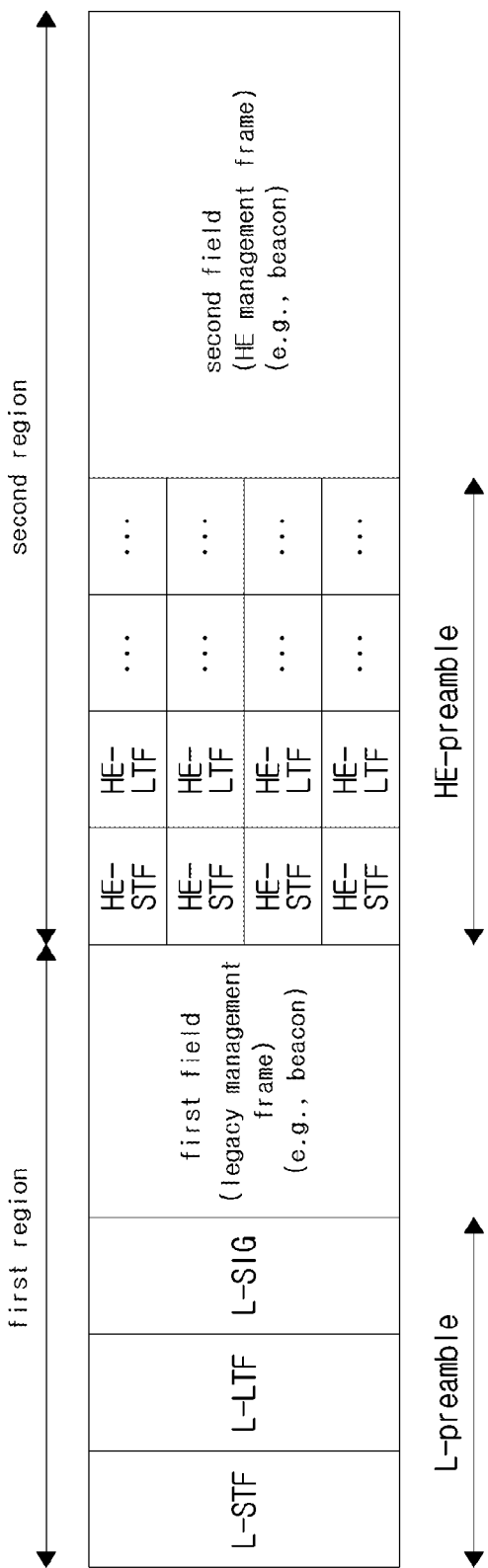
Figure 16:
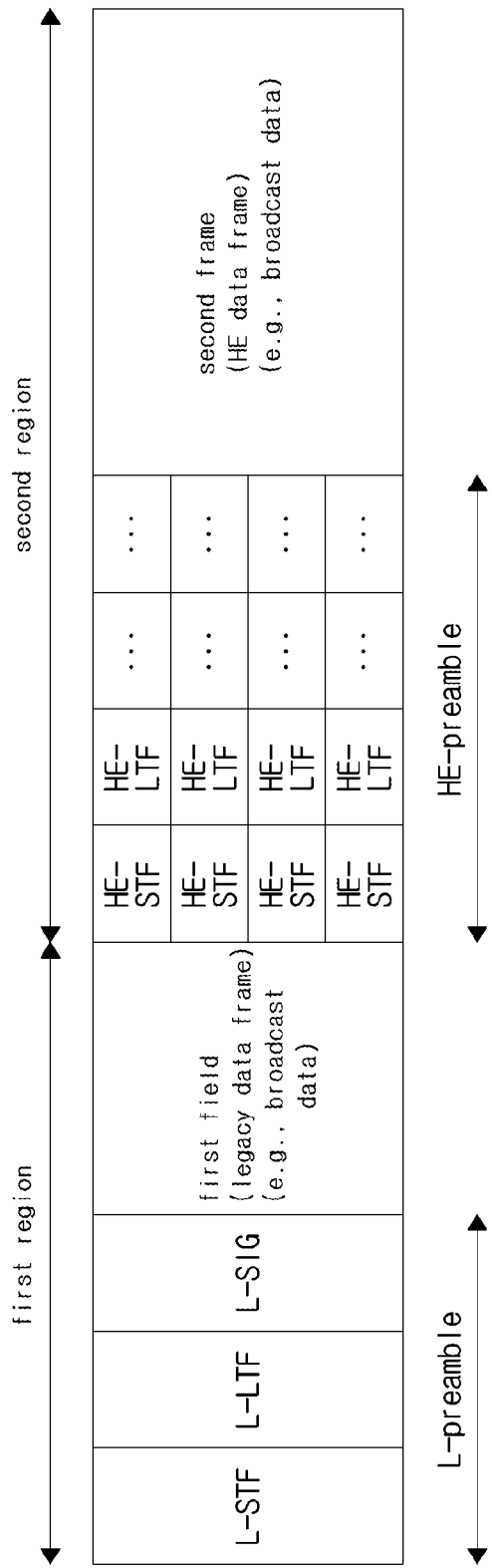

FIGS. 14, 15, and 16 depict the HE PPDU frame format according to examples of the present invention.

FIG. 14 illustrates an example of control frame transmission. While transmission of, for example, an RTS or CTS frame is shown in FIG. 14, the following description is applied to other control frames including an ACK frame, a block ACK frame, etc.

FIG. 15 illustrates an example of management frame transmission. While transmission of, for example, a beacon frame is shown in FIG. 15, the following description is applied to other management frames including a probe request frame, a probe response frame, etc.

FIG. 16 illustrates an example of data frame transmission. While transmission of for example, a broadcast data frame is shown in FIG. 16, the following description is applied to other data frames including a unicast frame, etc.

In the examples of FIGS. 14, 15, and 16, after L-STF, L-LTF, and L-SIG fields are sequentially transmitted, an MPDU (e.g., an RTS/CTS frame, a beacon frame, or a broadcast data frame) may be transmitted in the first field. A legacy STA may receive the MPDU of the first field and set its NAV through the Duration field of the MPDU. For this purpose, if only a legacy format is considered, the Length subfield of the L-SIG field may be set to a value corresponding to an ending time of transmission of the first region.

However, since the fields of the second region succeeds to the first region in the HE PPDU frame of the present invention, there is also a need for protecting a control frame, a management frame, or a data frame transmitted in the second region. Therefore, the Length subfield of the L-SIG field in the first region may be set to a value corresponding to an ending time of transmission of all of the first field, the HE-preamble, and the second field.

Or if the Length subfield of the L-SIG field is set to a value corresponding to an ending time of transmission of up to the first field, the Duration field of the MPDU (e.g., an RTS/CTS frame, a beacon frame, or a broadcast data frame) in the first field may be set to a value corresponding to an ending time of transmission of up to the HE-preamble and the second field.

Then, after the legacy-format MPDU of the first field, for example, an RTS/CTS frame, a beacon frame, or a broadcast data frame is transmitted, the RTS/CTS frame, the beacon frame, or the broadcast data frame may be retransmitted in an MPDU of the HE format. In this case, the HE-preamble and the second field may be transmitted successively to the first field, and the HE-format MPDU (e.g., the RTS/CTS frame, the beacon frame, or the broadcast data frame) may be included in the second field. Or the legacy-format MPDU of the first field may be different from the HE-format MPDU of the second field.

Further, successive transmission of the HE-preamble and the second field to the first field may be indicated by the SERVICE field of the MPDU included in the first field. For this purpose, a specific bit of the SERVICE field of the first field (e.g., a reserved bit of a conventional SERVICE field) may be used. If the specific bit of the SERVICE field of the first field is set to TRUE, this may indicate that the PPDU is configured in the HE PPDU format (i.e., the frame format with the first and second regions in combination) according to the present invention. That is, upon receipt of the frame with the specific bit of the SERVICE field set to TRUE, an STA may determine that the HE-preamble and the second field will be transmitted successively to the first region. On the other hand, if the specific bit of the SERVICE field of the first field is set to FALSE, this may indicate that the PPDU is configured in the legacy PPDU frame format (e.g., the frame format illustrated in FIG. 6). That is, upon receipt of the frame with the specific bit of the SERVICE field set to FALSE, the STA may determine that the HE-preamble and the second field will not be transmitted successively to the first region.

If a unicast frame is included in the HE PPDU frame format including a data frame as illustrated in FIG. 16, the ACK policy of the data frame may be set to block ACK. For example, if data frames for a plurality of STAs are transmitted simultaneously in the second region (e.g., if data for a plurality of STAs are transmitted simultaneously on a plurality of subchannels as illustrated in FIG. 7), the ACK policy of a data frame for only one STA may be set to Implicit Block Ack Request and the ACK policies of data frames for the remaining STAs may be set to block ACK, in order to prevent collision between ACK frames or block ACK frames simultaneously transmitted from the plurality of STAs. Accordingly, if a plurality of STAs receive data simultaneously in a HE PPDU frame, the block ACK of one of the STAs (i.e., in the case where the ACK policy of the data frame for the STA is set to Implicit Block Ack Request) may be transmitted shortly after the HE PPDU and the block ACKs of the remaining STAs may be transmitted in response to a block ACK request frame of the AP.

The time-domain configuration of the HE PPDU frame format according to the present invention has been described with reference to the examples of FIGS. 13 to 16. Now, a description will be given of the frequency-domain configuration of the HE PPDU frame format according to the present invention with reference to the examples of FIGS. 17 to 20. The examples of FIGS. 13 to 16 and the examples of FIGS. 17 to 20 may be applied to a HE PPDU frame format independently or in a combination of two or more of them.

FIGS. 17 to 20 depict UL and DL HE PPDU frame exchange sequences.

In the examples of FIGS. 17 to 20, the horizontal axis represents frequency and the vertical axis represents time. It is assumed that the frequency and time increase to the right and downward.

Figure 17:
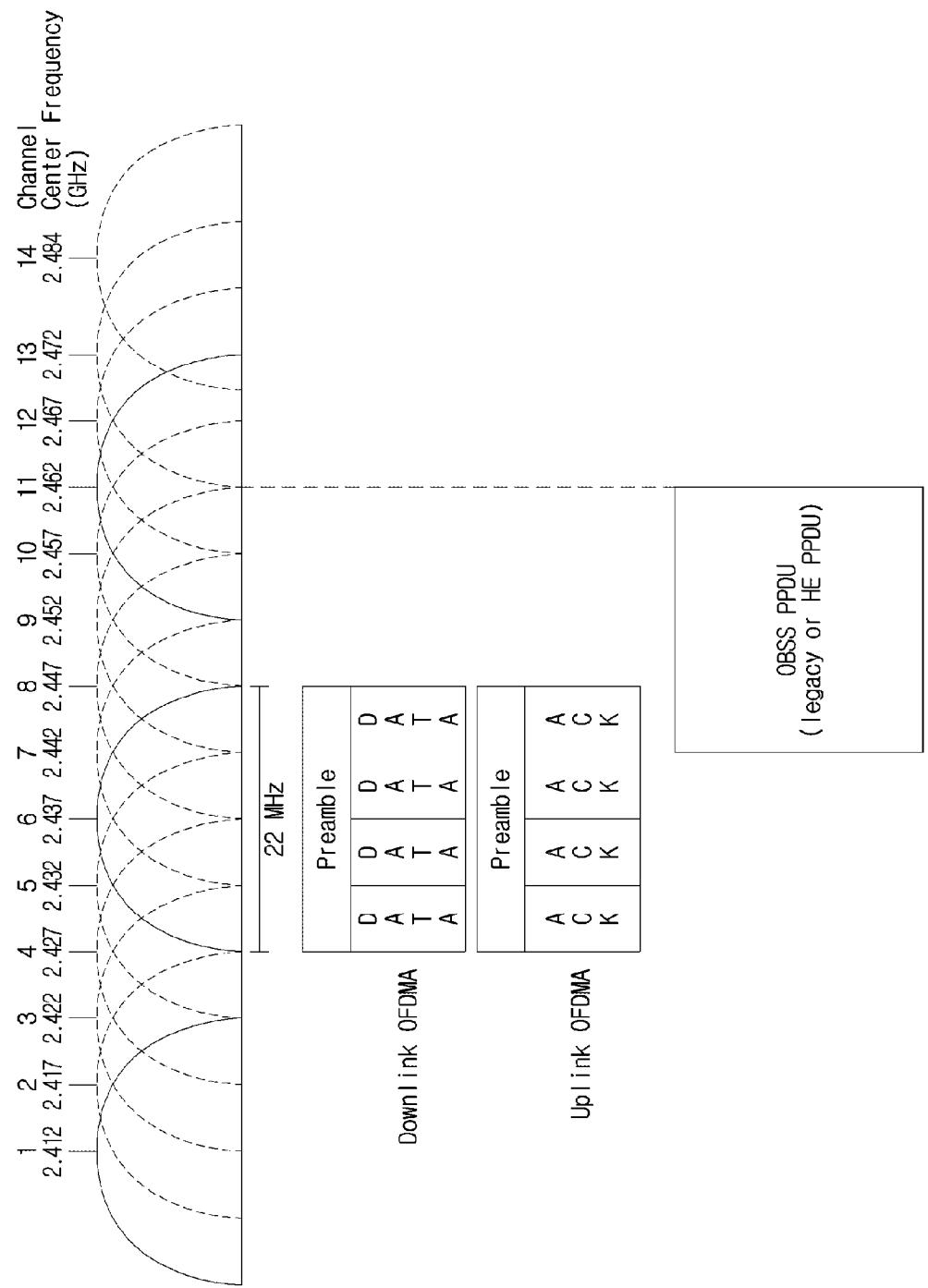
FIGS. 17 to 20 depict Uplink (UL) and Downlink (DL) HE PPDU frame exchange sequences according to the present invention.
Figure 18:
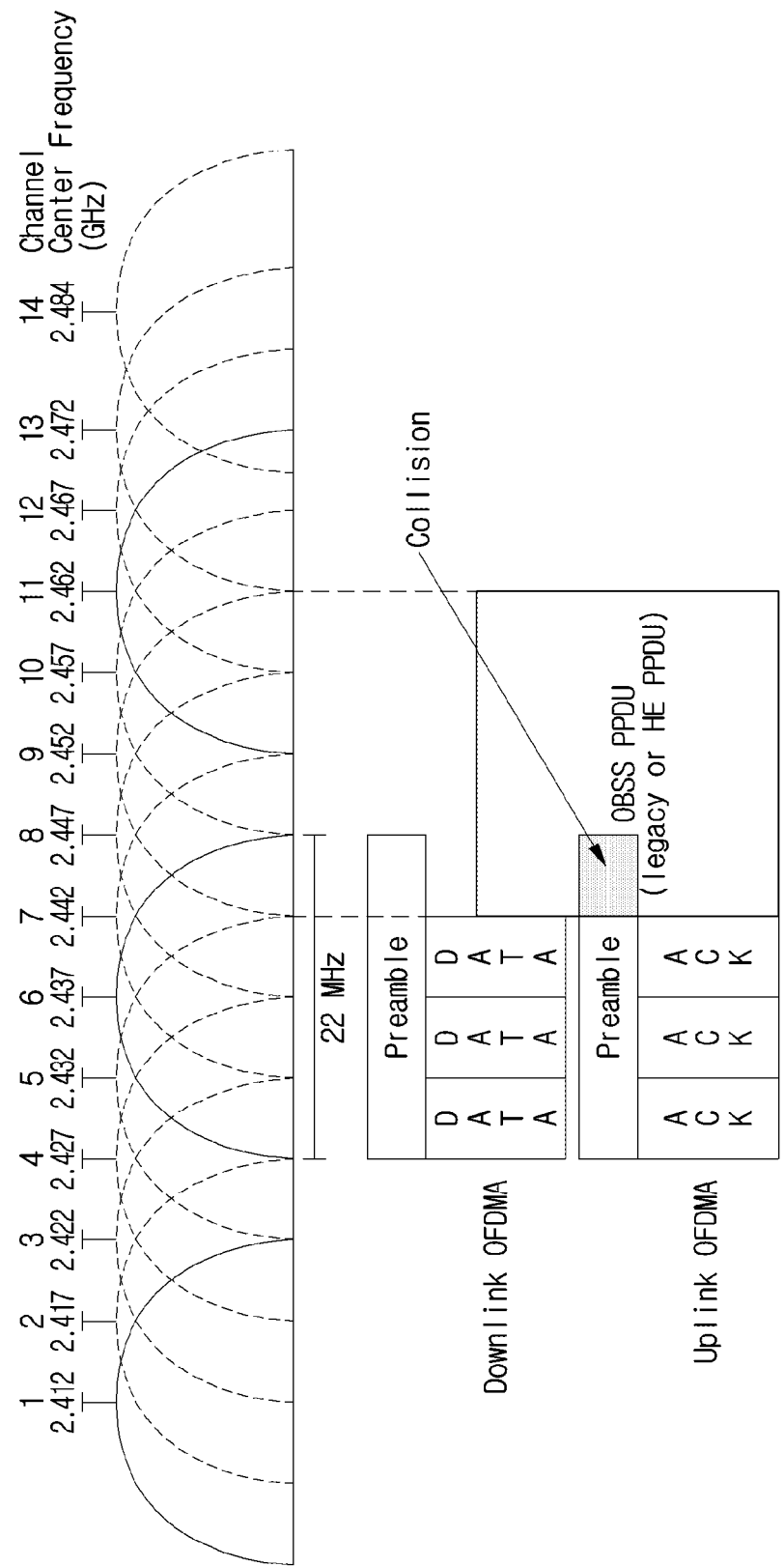
Figure 19:
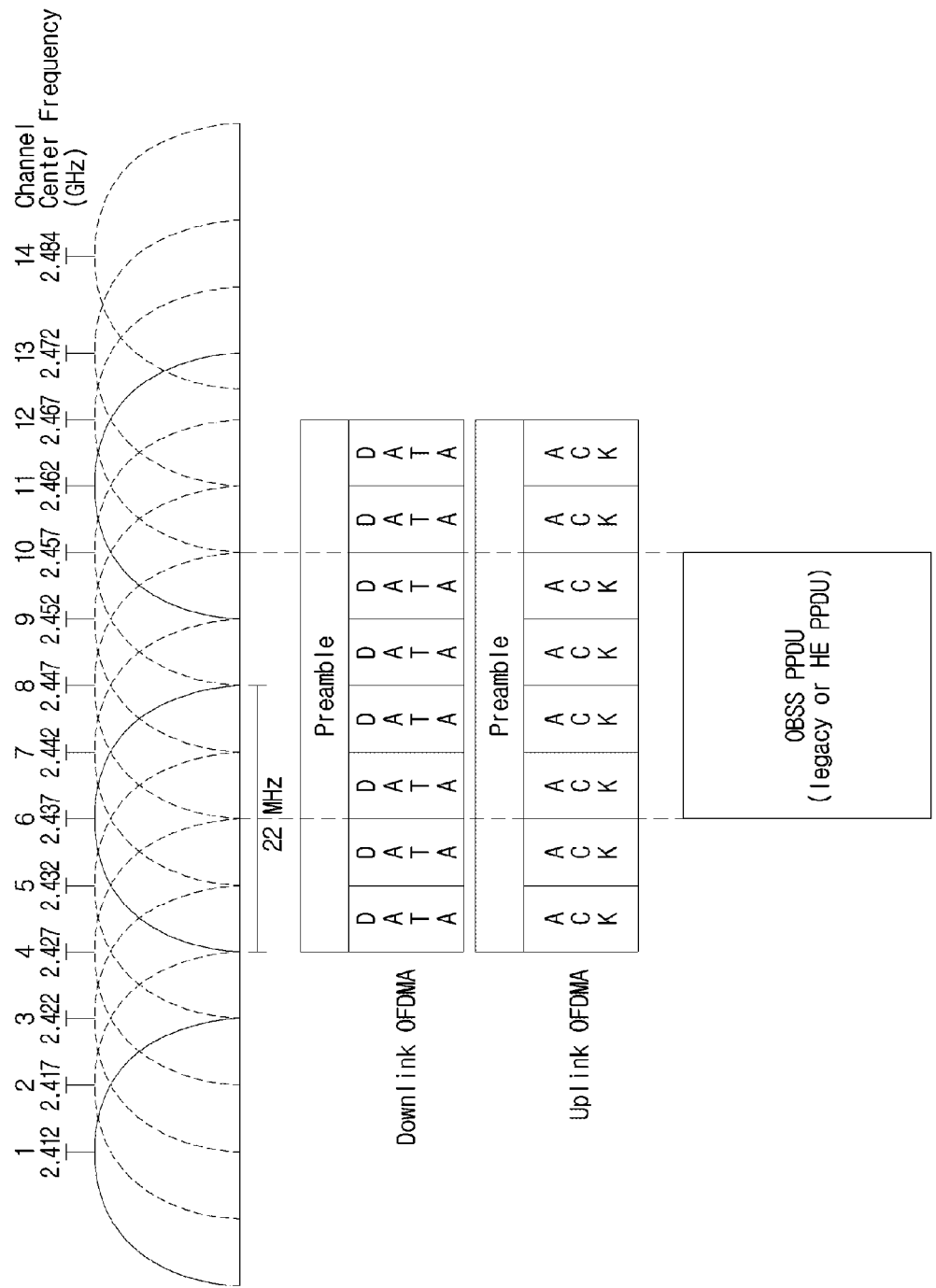
Figure 20:
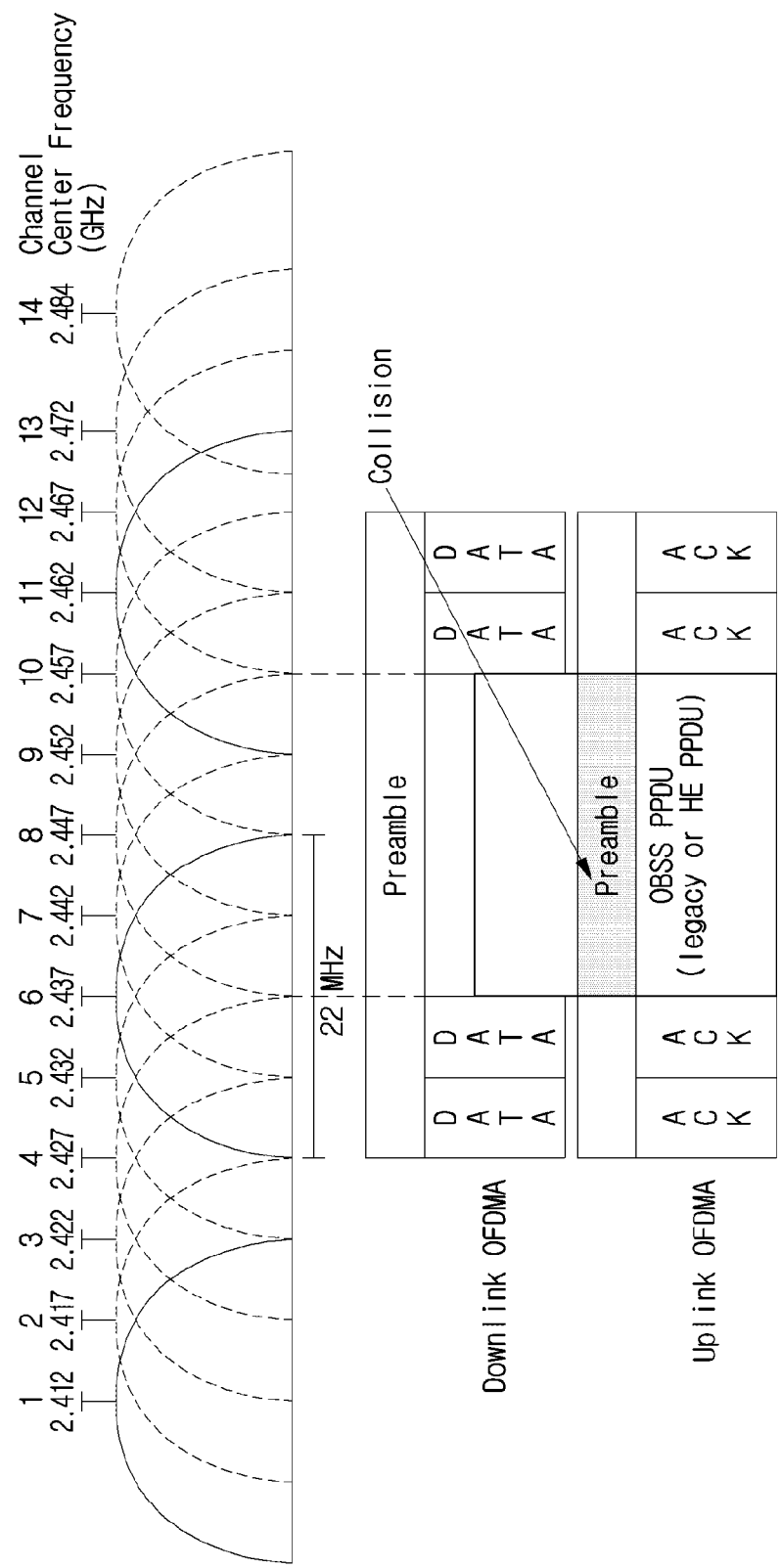

The examples of FIGS. 17 to 20 are based on the assumption of frame exchange in a 2.4-GHz band. FIGS. 17 and 18 illustrate UL or DL HE PPDU exchange on a 20-MHz channel. FIGS. 19 and 20 illustrate UL or DL HE PPDU exchange on a 40-MHz channel.

A UL or DL HE PPDU frame is shown simplified in the examples of FIGS. 17 to 20. That is, a preamble part corresponds to the first region (or the legacy region) described with reference to FIG. 13. Further, parts labeled with DATA in a DL HE PPDU frame and parts labeled with ACK in a UL HE PPDU frame in the examples of FIGS. 17 to 20 correspond to the second region (or the HE region) in the example of FIG. 13.

As illustrated in the examples of FIGS. 17 to 20, a HE OFDMA frame may include a part (e.g., the first region and the HE-preamble) having a transmission bandwidth that occupies one channel (e.g., a channel having a bandwidth of 20 MHz, 40 MHz, 80 MHz, or 160 MHz) and a part with a transmission bandwidth smaller than one channel (e.g., a subchannel unit of the second region). As described above, a HE PPDU supporting OFDMA by allocation of a plurality of subchannels in one channel may be referred to as a HE OFDMA PPDU.

If all subchannels (e.g., four subchannels each having a transmission bandwidth of 5 MHz) within one channel (e.g., a channel having a bandwidth of 20 MHz) are used for transmission in a DL HE OFDMA PPDU and a UL HE OFDMA PPDU as in the example of FIG. 17, channel access of an Overlapping BSS (OBSS) may be deferred during an exchange sequence of the DL HE OFDMA PPDU and the UL HE OFDMA PPDU according to a CCA mechanism.

In the case where a first BSS and a second BSS are placed in a mutual OBSS relationship, if an AP of the first BSS transmits a DL HE OFDMA PPDU on a channel having a bandwidth of 20 MHz at a central frequency of 2.437 GHz, an AP of the second BSS may perform carrier sensing before starting transmission on a channel having a bandwidth of 20 MHz at a central frequency of 2.452 GHz in the example of FIG. 17. Herein, when the AP of the second BSS performs carrier sensing, the AP determines that a medium is busy because of signal transmission on a subchannel of the highest of the frequencies of subchannels used by the first BSS. Thus the AP of the second BSS may defer channel access until the medium is idle.

As illustrated in the example of FIG. 18, however, if at least a part of the subchannels (e.g., the four subchannels each having a transmission bandwidth of 5 MHz) in the channel (i.e., the channel having a bandwidth of 20 MHz) is not used for transmission in the DL HE OFDMA PPDU and the UL HE OFDMA PPDU, the channel access of the OBSS may not be deferred. Simultaneous transmission from OBSSs may cause collision and the resulting interference may degrade system performance.

The example of FIG. 18 is based on the assumption that the AP of the first BSS does not use a subchannel having the highest frequency in transmitting a DL HE OFDMA PPDU on the 20-MHz channel at the center frequency of 2.437 GHz. In this case, if the AP of the second BSS performs carrier sensing before starting transmission on the 20-MHZ channel at the center frequency of 2.452 GHz, the AP may determine that the channel is idle at the moment. Therefore, the AP of the second BSS may start to transmit a PPDU (e.g., a legacy PPDU or a HE PPDU). However, an STA(s) that have received data from the AP in the first BSS may transmit UL ACK frames (in a HE PPDU format). Since at least the preambles (or first regions) of the ACK frames are transmitted in a transmission bandwidth corresponding to the bandwidth of one channel, these collide with a PPDU transmitted by the AP of the second BSS. Thus, the AP of the first BSS may fail to receive UL ACK frames transmitted by the STA(s) in the first BSS.

Although the examples of FIGS. 18 and 19 are similar to the examples of FIGS. 17 and 18, FIGS. 18 and 19 illustrate an exemplary operation for the case where central subchannels from among a plurality of subchannels within a channel having a bandwidth of 40 MHz are not used.

If all subchannels (e.g., eight subchannels each having a transmission bandwidth of 5 MHz) within one channel (e.g., a channel having a bandwidth of 40 MHz) are used for transmission in a DL HE OFDMA PPDU and a UL HE OFDMA PPDU as in the example of FIG. 19, channel access of an OBSS may be deferred during an exchange sequence of the DL HE OFDMA PPDU and the UL HE OFDMA PPDU according to the CCA mechanism.

In the case where a first BSS and a second BSS are placed in a mutual OBSS relationship, if an AP of the first BSS transmits a DL HE OFDMA PPDU on a channel having a bandwidth of 40 MHz at a central frequency of 2.447 GHz, an AP of the second BSS may perform carrier sensing before starting transmission on a channel having a bandwidth of 20 MHz different from the bandwidth of the first BSS at the central frequency of 2.447 GHz as the first BSS in the example of FIG. 19. Herein, when the AP of the second BSS performs carrier sensing, the AP determines that a medium is busy because of signal transmission on four middle subchannels among the subchannels used by the first BSS. Thus the AP of the second BSS may defer channel access until the medium is idle.

As illustrated in the example of FIG. 20, however, if at least a part of the subchannels (e.g., the eight subchannels each having a transmission bandwidth of 5 MHz) in the channel (i.e., the channel having a bandwidth of 40 MHz) are not used for transmission in the DL HE OFDMA PPDU and the UL HE OFDMA PPDU, the channel access of the OBSS may not be deferred. Simultaneous transmission from OBSSs may cause collision and the resulting interference may degrade system performance.

The example of FIG. 20 is based on the assumption that the AP of the first BSS does not use four middle subchannels in transmitting a DL HE OFDMA PPDU on the 40-MHz channel at the center frequency of 2.447 GHz. In this case, if the AP of the second BSS performs carrier sensing before starting transmission on the 20-MHZ channel at the center frequency of 2.447 GHz, the AP may determine that the channel is idle at the moment. Therefore, the AP of the second BSS may start to transmit a PPDU (e.g., a legacy PPDU or a HE PPDU). However, an STA(s) that have received data from the AP in the first BSS may transmit UL ACK frames (in a HE PPDU format). Since at least the preambles (or first regions) of the ACK frames are transmitted in a transmission bandwidth corresponding to the bandwidth of one channel, these collide with a PPDU transmitted by the AP of the second BSS. Thus, the AP of the first BSS may fail to receive UL ACK frames transmitted by the STA(s) in the first BSS.

As described before, if a part of a plurality of subchannels defined within one channel are not allocated for transmission, a preamble transmitted in a transmission bandwidth corresponding to the bandwidth of the channel may collide with a transmission from another entity. To prevent the collision, a HE PPDU frame (particularly, a HE OFDMA PPDU) may be configured in the frequency domain as follows according to the present invention.

First of all, a HE DATA field (e.g., the second field of the second region in the example of FIG. 13) of a HE PPDU may correspond to a plurality of tones on one channel (e.g., a channel having a bandwidth of 20 MHz, 40 MHz, 80 MHz, or 160 MHz) and the plurality of tones may include a plurality of data tones and a plurality of pilot tones. Each tone may correspond to one subcarrier. In the case of a HE OFDMA PPDU, one channel may include a plurality of subchannels and the transmission bandwidths of data on the plurality of subchannels may be different. Each of the subchannels may include a plurality of tones (i.e., a plurality of data tones and a plurality of pilot tones), and as the transmission bandwidth of a subchannel is larger, the subchannel may include more tones.

According to the present invention, the problem encountered with the example of FIG. 18 may be overcome by preventing non-use of data tones at both edges of a channel. That is, it may be regulated that lowest-frequency and highest-frequency data tones among a plurality of data tones in a HE OFDMA PPDU are necessarily used for OFDMA transmission (e.g., transmission on a subchannel). The bandwidth of the OFDMA transmission including the lowest-frequency or highest-frequency data tones (e.g., the bandwidth of the subchannel) may be any available transmission bandwidth within the channel bandwidth. It may be regulated that the highest and lowest data tones of the channel are used necessarily for OFDMA transmission in any transmission bandwidth.

According to the present invention, the problem encountered with the example of FIG. 20 may be overcome by preventing non-use of contiguous data tones of 20 MHz or above. That is, it may be regulated that contiguous data tones corresponding to a bandwidth equal to or larger than 20 MHz in a HE OFDMA PPDU are necessarily used for OFDMA transmission in 20 MHz or above. The contiguous data tones of 20 MHz or above may include a lowest-frequency data tone or a highest-frequency data tone, or a data tone adjacent to a DC frequency without including one or both of the lowest-frequency and highest-frequency data tones.

Some data tones of a channel may be used for different transmission bandwidth modes (or resource units of different sizes) for OFDMA transmission. For example, frequency positions corresponding to data tones of a channel may be used for OFDMA transmission in a resource unit of a first size (e.g., corresponding to a 2.5-MHz subchannel), and for OFDMA transmission in another resource unit of a second, third, or any other size (e.g., corresponding to one or more of a 5-MHz subchannel, a 10-MHz subchannel, a 20-MHz subchannel, and a 40-MHz subchannel). Meanwhile, some data tones may be used for only one transmission bandwidth mode of OFDMA transmission (or a resource unit of one size). For example, frequency positions corresponding to data tones of a 80-MHz channel may be used only for OFDMA transmission in a resource unit of a first size (e.g., corresponding to a 2.5-MHz subchannel), not for OFDMA transmission in a resource unit of a different size (e.g., corresponding to a 5-MHz subchannel, a 10-MHz subchannel, a 20-MHz subchannel, or a 40-MHz subchannel).

According to the present invention, if a plurality of transmission bandwidth modes are supported for contiguous data tones of a HE OFDMA PPDU, the data tones may be used for OFDMA transmission in one of the plurality of supported transmission bandwidth modes. On the other hand, if a single transmission bandwidth mode is supported for contiguous data tones of a HE OFDMA PPDU, the data tones may be used for OFDMA transmission in the supported single transmission bandwidth mode, or may not be used for OFDMA transmission.

That is, according to the present invention, if contiguous data tones of a HE OFDMA PPDU are available to a plurality of resource units of different sizes, the data tones may belong to one of the resource units and may be used for OFDMA transmission. On the other hand, if contiguous data tones of a HE OFDMA PPDU are available only to a resource unit of a single size, the data tones may belong to only the resource unit or may not be used for OFDMA transmission.

In the foregoing examples of the present invention, a transmitter may configure and transmit a HE PPDU and a receiver may receive and decode the HE PPDU, according to one or more of the exemplary time-domain or frequency domain configurations of the HE PPDU.

If an AP is a transmitter and one or more STAs are receivers, the AP may apply one or more of the aforedescribed various examples of the present invention to configure a DL HE PPDU for the one or more STAs. If the AP transmits the DL HE PPDU, each of the one or more STAs may receive and decode the DL HE PPDU.

If an STA is a transmitter and an AP is a receiver, the STA may receive a trigger frame for UL MU transmission from the AP. UL transmission scheduling information included in the trigger frame may include information about one or more of the various examples of the present invention. Or a HE PPDU configuration scheme of the present invention to be applied may be preset for the STA. The STA may transmit a UL HE PPDU configured based on the UL transmission scheduling information included in the trigger frame (simultaneously with one or more other STAs) to the AP, and the AP may receive and decode the UL HE PPDU from one or more STAs.

Figure 21:
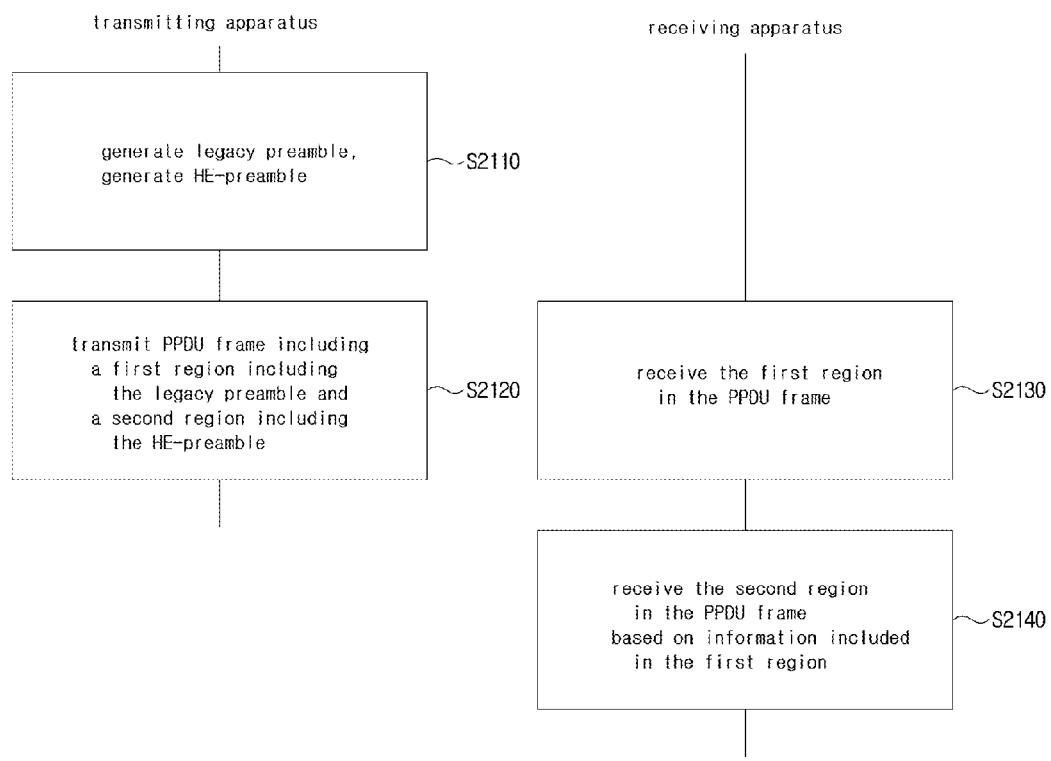
FIG. 21 is a flowchart illustrating an exemplary method according to the present invention.

FIG. 21 is a flowchart illustrating an exemplary method according to the present invention.

A transmitter may generate a legacy preamble and a HE-preamble in step S2120 and transmit a PPDU frame including a first region with the legacy preamble and a second region with the HE-preamble to a receiver in step S2120. The first region may include the legacy preamble and a first field, and the second region may include the HE-preamble and a second field (refer to FIG. 13). For details of the first and second regions, the afore-described various embodiments of the present invention may be referred to.

If the transmitter is an AP, the receiver may be one or more STAs. If the receiver is a plurality of STAs, the PPDU frame may be a HE PPDU for DL MU transmission. If the transmitter is an STA, the receiver may be an AP. If the transmitter performs simultaneous transmission to the AP with one or more other STAs, the PPDU frame may be a HE PPDU for UL MU transmission.

In step S2130, the receiver may receive and decode the first region of the PPDU frame from the transmitter. The receiver may receive the second region based on information acquired from the first region in step S2140. For example, if the receiver is a legacy STA, the receiver may decode only the first region without the second region. If the receiver is a HE STA or an AP, the receiver may decode both the first and second regions.

While the exemplary method has been described with reference to FIG. 21 as a series of operations for simplicity of description, this does not limit the sequence of steps. When needed, steps may be performed at the same time or in a different sequence. All of the exemplary steps are not always necessary to implement the method according to the present invention.

The foregoing embodiments of the present invention may be implemented separately or combinations of two or more of the embodiments may be implemented simultaneously, for the method of FIG. 21.

The present invention includes an apparatus for processing or performing the method according to the present invention (e.g., the wireless device and its components described with reference to FIGS. 1, 2, and 3).

The present invention includes software (an operating system (OS), an application, firmware, a program, etc.) for executing the method according to the present invention in a device or a computer, and a medium storing the software that can be executed in a device or a computer.

While various embodiments of the present invention have been described in the context of an IEEE 802.11 system, they are applicable to various mobile communication systems.

What is claimed is:

1. A method for transmitting a Physical layer Protocol Data Unit (PPDU) frame to a reception apparatus by a transmission apparatus in a Wireless Local Area Network (WLAN), the method comprising:
    generating a legacy preamble;
    generating a High Efficiency (HE)-preamble; and
    transmitting the PPDU frame including a first region and a second region to the reception apparatus, the first region including the legacy preamble and a first field and the second region including the HE-preamble,
    wherein the first field has a variable length, and the HE-preamble includes a High Efficiency-Short Training Field (HE-STF) following the first field,
    wherein the second region further includes a second field corresponding to a plurality of data tones within one channel, and
    wherein the transmission apparatus is an Access Point (AP) and the reception apparatus is a station (STA), the second field includes data for a plurality of STAs, and the data for the plurality of STAs are transmitted simultaneously on a plurality of subchannels within the one channel.

2. The method according to claim 1, wherein the first field includes a variable number of Orthogonal Frequency Division Multiplexing (OFDM) symbols.

3. The method according to claim 1, wherein the first field is transmitted after the legacy preamble.

4. The method according to claim 1, wherein the first field includes control information about the second region.

5. The method according to claim 1, wherein the first region is configured to be decodable by a legacy Station (STA) and a HE STA, and the second region is configured to be decodable by a HE STA.

6. The method according to claim 1, wherein the first region includes 64 Fast Fourier Transform (FFT)-based OFDM symbols and the second region includes 256 FFT-based OFDM symbols.

7. The method according to claim 1, wherein contiguous data tones only used for a resource unit of a first size among the plurality of data tones are not used for a resource unit of a different size.

8. A method for receiving a Physical layer Protocol Data Unit (PPDU) frame from a transmission apparatus by a reception apparatus in a Wireless Local Area Network (WLAN), the method comprising:
    receiving a first region including a legacy preamble and a first field in a PPDU frame; and
    receiving a second region including a High Efficiency (HE)-preamble in the PPDU frame based on information included in the first region,
    wherein the first field has a variable length, and the HE-preamble includes a High Efficiency-Short Training Field (HE-STF) following the first field,
    wherein the second region further includes a second field corresponding to a plurality of data tones within one channel, and
    wherein the transmission apparatus is an Access Point (AP) and the reception apparatus is a station (STA), the second field includes data for a plurality of STAs, and the data for the plurality of STAs are transmitted simultaneously on a plurality of sub channels within the one channel.

9. The method according to claim 8, wherein the first field includes a variable number of Orthogonal Frequency Division Multiplexing (OFDM) symbols.

10. The method according to claim 8, wherein the first field is transmitted after the legacy preamble.

11. The method according to claim 8, wherein the first field includes control information about the second region.

12. The method according to claim 8, wherein if the reception apparatus is a legacy Station (STA), the second region is not decoded based on the information included in the first region, and if the reception apparatus is a HE STA, the second region is decoded based on the information included in the first region.

13. The method according to claim 8, wherein the first region includes 64 Fast Fourier Transform (FFT)-based OFDM symbols and the second region includes 256 FFT-based OFDM symbols.

14. The method according to claim 8, wherein contiguous data tones used for a resource unit of a first size among the plurality of data tones are not used for a resource unit of a different size.

* * * * *